United States Patent
Choi et al.

(10) Patent No.: US 10,659,127 B2
(45) Date of Patent: May 19, 2020

(54) METHOD AND DEVICE FOR PERFORMING BEAM SCANNING IN WIRELESS ACCESS SYSTEM SUPPORTING MILLIMETER WAVE

(71) Applicant: LG ELECTRONICS INC., Seoul (KR)

(72) Inventors: Kukheon Choi, Seoul (KR); Jiwon Kang, Seoul (KR); Kitae Kim, Seoul (KR); Kilbom Lee, Seoul (KR); Heejin Kim, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/099,403

(22) PCT Filed: May 12, 2016

(86) PCT No.: PCT/KR2016/004999
§ 371 (c)(1),
(2) Date: Nov. 6, 2018

(87) PCT Pub. No.: WO2017/195916
PCT Pub. Date: Nov. 16, 2017

(65) Prior Publication Data
US 2019/0215045 A1    Jul. 11, 2019

(51) Int. Cl.
*H04B 7/06*    (2006.01)
*H04B 7/08*    (2006.01)

(52) U.S. Cl.
CPC ......... *H04B 7/0626* (2013.01); *H04B 7/0617* (2013.01); *H04B 7/0695* (2013.01); *H04B 7/088* (2013.01)

(58) Field of Classification Search
CPC .. H04B 7/0617; H04B 7/0619; H04B 7/0621; H04B 7/0626; H04B 7/0632; H04B 7/0695; H04B 7/088
See application file for complete search history.

(56) References Cited

U.S. PATENT DOCUMENTS

| 2010/0103900 A1* | 4/2010 | Yeh | H04B 7/0695 370/330 |
| 2014/0098912 A1 | 4/2014 | Yin et al. | |

(Continued)

FOREIGN PATENT DOCUMENTS

KR    1020090035969    4/2009

OTHER PUBLICATIONS

PCT International Application No. PCT/KR2016/004999, Written Opinion of the International Searching Authority dated Feb. 8, 2017, 17 pages.

*Primary Examiner* — David B Lugo
(74) *Attorney, Agent, or Firm* — Lee, Hong, Degerman, Kang & Waimey

(57) ABSTRACT

The present invention relates to a wireless access system supporting millimeter wave (mmWave), and provides a transmission/reception beam scanning method, a channel state information feedback method, and devices supporting the same. According to an embodiment of the present invention, a method for scanning a transmission/reception beam by a millimeter wave (mmWave) terminal in a wireless access system supporting mmWave may comprise the steps of: performing long term beam scanning in period N; transmitting feedback information including a first transmission beam identifier (Tx beam ID) acquired through the long term beam scanning to a mmWave base station; receiving an upper layer signal including reception beam scanning configuration information allocated for short term beam scanning; and performing the short term beam scanning in a (Continued)

reception beam scanning area on the basis of the reception beam scanning configuration information.

6 Claims, 13 Drawing Sheets

(56) References Cited

U.S. PATENT DOCUMENTS

| | | |
|---|---|---|
| 2015/0004918 A1 | 1/2015 | Wang et al. |
| 2016/0021548 A1 | 1/2016 | Raghavan et al. |
| 2016/0095102 A1 | 3/2016 | Yu et al. |
| 2018/0091249 A1* | 3/2018 | Han .................... H04L 27/2613 |
| 2018/0278311 A1* | 9/2018 | Qiu ..................... H04B 7/0617 |

* cited by examiner

METHOD AND DEVICE FOR PERFORMING BEAM SCANNING IN WIRELESS ACCESS SYSTEM SUPPORTING MILLIMETER WAVE

CROSS-REFERENCE TO RELATED APPLICATIONS

This application is the National Stage filing under 35 U.S.C. 371 of International Application No. PCT/KR2016/004999, filed on May 12, 2016, the content of which is hereby incorporated by reference herein in their entirety.

TECHNICAL FIELD

The present invention relates to a wireless access system supportive of millimeter Wave (mmWave), and more particularly, to a transmission/reception beam scanning method, channel state information feedback method and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

One technical task of the present invention is to provide an efficient data transceiving method in a wireless access system supportive of mmWave.

Another technical task of the present invention is to provide a method of forming a pair of Tx and Rx antenna beams.

Another technical task of the present invention is to provide methods of increasing throughput through data transmission/reception robust to a short term channel variation or additional resource allocation by measuring channel state information and/or Rx power in case of performing Tx/Rx antenna beam scanning.

Another technical task of the present invention is to provide methods for resolving complexity in case of analog/digital beam estimation for hybrid beamforming.

Further technical task of the present invention is to provide apparatuses for supporting the above-mentioned methods.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention relates to a wireless access system supportive of millimeter Wave (mmWave), and provides a transmission/reception beam scanning method, channel state information feedback method and apparatuses for supporting the same.

In one technical aspect of the present invention, provided herein is a method of scanning transmission and reception beams by a millimeter Wave (mmWave) user equipment in a wireless access system supportive of mmWave, the method including performing a long term beam scanning in a period N, transmitting feedback information containing a first transmission beam Identifier (Tx beam ID) obtained through the long term beam scanning to an mmWave base station, receiving a higher layer signal containing reception beam scanning configuration information assigned for a short term beam scanning, and performing the short term beam scanning in a reception beam scanning region based on the reception beam scanning configuration information.

Here, the first Tx beam ID may be mapped to a specific beam scanning subframe and then used for transmitting and receiving signals to and from the mmWave user equipment preferring to the first Tx beam ID.

The performing the long term beam scanning may include receiving a first preamble and obtaining first Channel Quality Information (CQI) based on the first preamble.

The performing the short term beam scanning may include receiving a second preamble and obtaining second CQI based on the second preamble.

The method may further include comparing the first CQI and the second CQI with each other. When the first CQI is equal to or greater than the second CQI, the mmWave user equipment may feed back the second CQI to the mmWave base station. When the first CQI is smaller than the second CQI, the mmWave user equipment may feed back a second Tx beam ID mapped to the second preamble and a Temporary User Equipment IDentifier (TUEID) of the mmWave user equipment to the mmWave base station.

When the first CQI is smaller than the second CQI, the mmWave user equipment may receive allocation of a resource additionally in a beam scanning subframe where the second Tx beam ID mapped.

In another technical aspect of the present invention, provided herein is a millimeter Wave (mmWave) user equipment configured to scan transmission and reception beams in a wireless access system supportive of mmWave, the mmWave user equipment including a transmitter, a receiver, and a processor for performing scanning transmission and reception beams, wherein the processor is configured to control the receiver to perform a long term beam scanning in a period N, control the transmitter to transmit feedback information containing a first transmission beam Identifier (Tx beam ID) obtained through the long term beam scanning to an mmWave base station, control the receiver to receive a higher layer signal containing reception beam scanning configuration information assigned for a short term beam scanning, and control the receiver to perform the short term beam scanning in a reception beam scanning region based on the reception beam scanning configuration information.

Here, the first Tx beam ID may be mapped to a specific beam scanning subframe and then used for transmitting and receiving signals to and from the mmWave user equipment preferring to the first Tx beam ID.

In the long term beam scanning, the receiver may be controlled to receive a first preamble, and the processor may be further configured to obtain first Channel Quality Information (CQI) based on the first preamble.

In the short term beam scanning, the receiver may be controlled to receive a second preamble, and the processor may be further configured to obtain second CQI based on the second preamble.

The processor may compare the first CQI and the second CQI with each other. When the first CQI is equal to or greater than the second CQI, the processor may control the transmitter to feed back the second CQI to the mmWave base station. When the first CQI is smaller than the second CQI, the processor may control the transmitter to feed back a second Tx beam ID mapped to the second preamble and a Temporary User Equipment IDentifier (TUEID) of the mmWave user equipment to the mmWave base station.

When the first CQI is smaller than the second CQI, the mmWave user equipment may receive allocation of a resource additionally in a beam scanning subframe where the second Tx beam ID mapped.

The above aspects of the present invention are just parts of preferred embodiments of the present invention, and various embodiments reflecting the technical features of the present invention can be derived and understood from the following description by those having ordinary skill in the technical field to which the present invention pertains.

Advantageous Effects

According to embodiments of the present invention, the following effects are provided.

First of all, by adaptively coping with a change of a short term channel environment even in an mmWave communication method sensitive to the short term channel environment, robust data transmission/reception can be performed.

And, by performing scanning suitable for properties of an mmWave system through long term beam scanning and short term beam scanning, it is able to efficiently search for a preferred Tx beam ID of a UE.

Moreover, if a preferred beam Tx ID is detected through short term scanning as well as a radio resource allocated to an mmWave UE through long term scanning, it is able to increase data throughput by receiving allocation of an additional radio resource.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention, illustrate embodiments of the invention and together with the description serve to explain the principle of the invention.

BEST MODE FOR INVENTION

Figure 1:
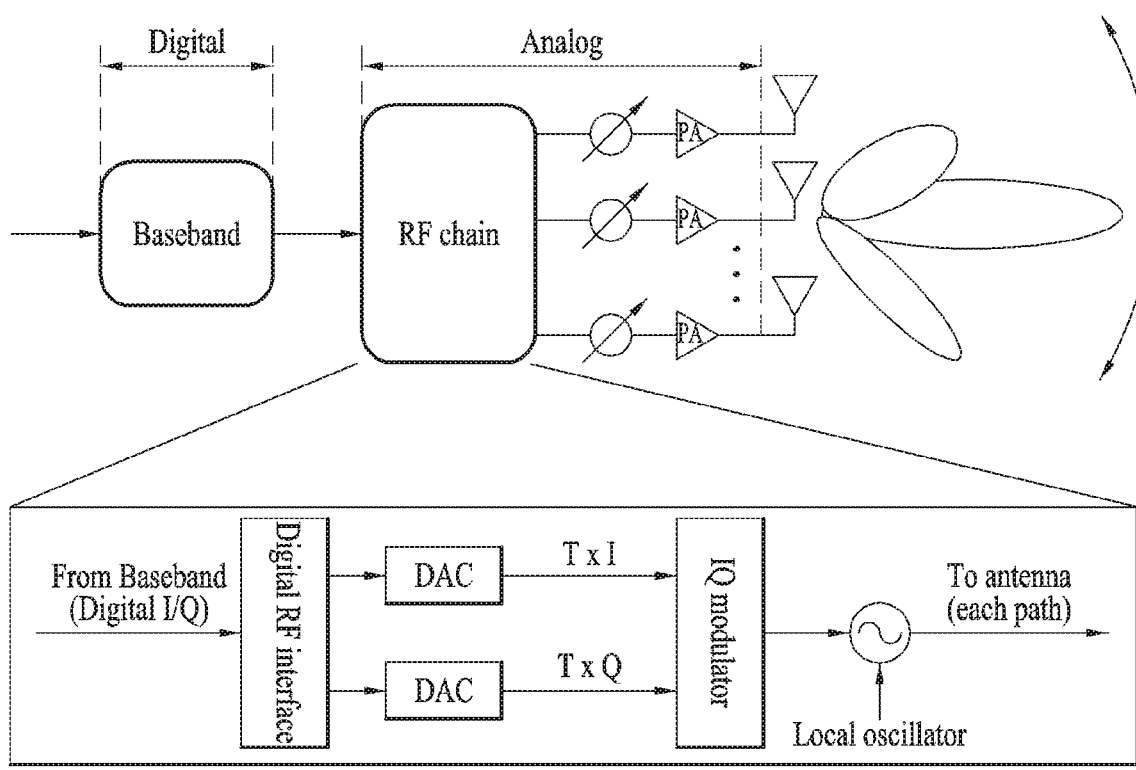
FIG. 1 is a block diagram showing a transmitter including an analog beamformer and a radio frequency (RF) chain.

The below-described embodiments of the present invention relate to a wireless access system supportive of millimeter Wave (mmWave), and more particularly, to a transmission/reception beam scanning method, channel state information feedback method and apparatus for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical idea and scope of the present disclosure.

Hereinafter, 3GPP LTE/LTE-A system which is one of examples of wireless access systems which are used in the embodiments of the present invention.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. Hybrid Beamforming 1.1 Analog Beamforming Technology and Digital Beamforming Technology Existing beamforming technology using multiple antennas may be roughly divided into analog beamforming technology and digital beamforming technology according to location, to which a beamforming weight vector/precoding vector is applied.

FIG. 1 is a block diagram showing a transmitter including an analog beamformer and a radio frequency (RF) chain.

First, the analog beamforming method is a representative beamforming method applied to an initial multi-antenna structure, which divides an analog signal subjected to digital signal processing into a plurality of paths and performs beamforming through a phase shifter (PS) and a power amplifier (PA) of each path. As shown in FIG. 1, for analog beamforming, an analog signal derived from a single digital signal needs to be processed by a PA and a PS connected to each antenna. That is, in an analog stage, a complex weight is processed by the PS and the PA. Here, a radio frequency (RF) chain means a processing block for converting a baseband (BB) signal into an analog signal and the configuration thereof is shown in FIG. 2.

In the analog beamforming method, beamforming accuracy is determined according to device characteristics of the PS and the PA. In addition, the analog beamforming method is suitable for narrowband transmission due to control characteristics of the devices. In contrast, due to a hardware structure in which it is difficult to implement multiple stream transmission, multiplexing gain for increasing a transfer rate is relatively low. In addition, it is difficult to perform beamforming per user based on orthogonal resource assignment.

Figure 2:
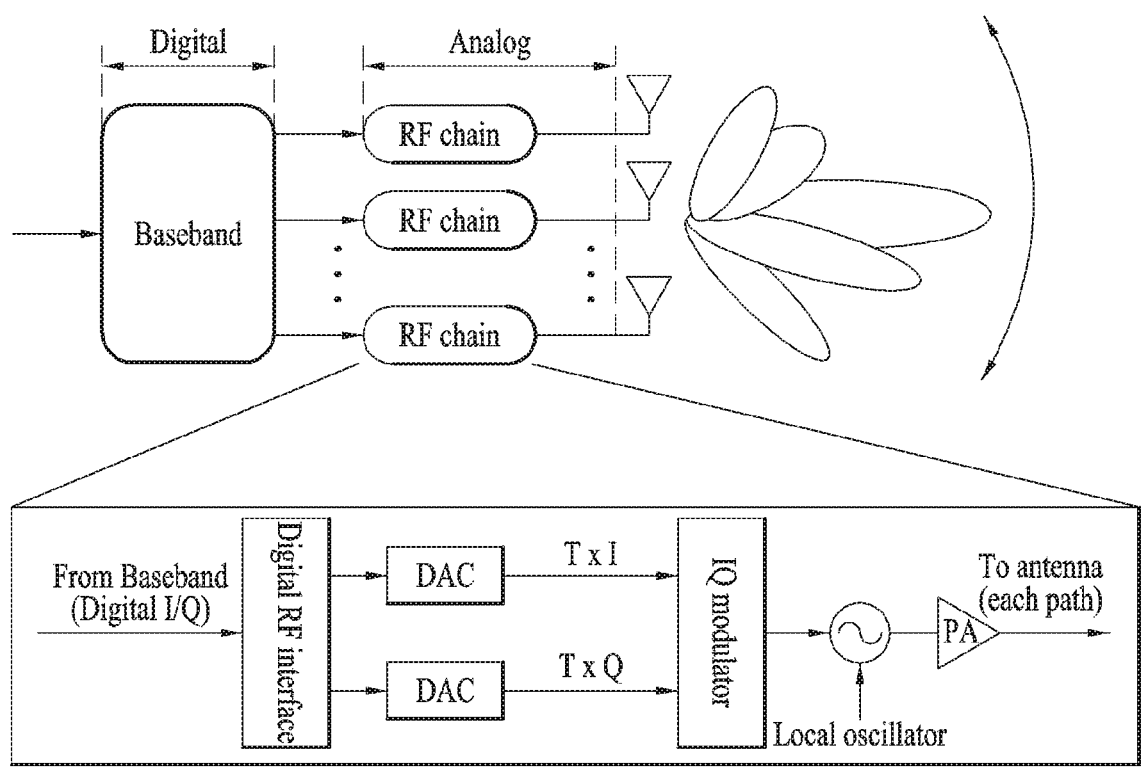
FIG. 2 is a block diagram showing a transmitter including a digital beamformer and a radio frequency (RF) chain.

FIG. 2 is a block diagram showing a transmitter including a digital beamformer and a radio frequency (RF) chain.

In digital beamforming, unlike analog beamforming, a transmitter performs beamforming in a digital stage using a BB process in order to maximize diversity and multiplexing gain in a multiple input multiple output (MIMO) environment. For example, as shown in FIG. 2, precoding is performed in a BB process such that beamforming is possible (here, an RF chain includes a PA), because a complex weight derived for beamforming is directly applied to transmitted data.

In addition, in the digital beamforming method, since beamforming may be differently performed per user, it is possible to support simultaneous beamforming for multiple users. Since beamforming is independently performed per user, to which orthogonal resources are assigned, scheduling flexibility is high and a transmission end suiting a system purpose can be employed. In addition, if MIMO-orthogonal frequency division multiplexing (OFDM) technology is applied in a broadband transmission environment, it is possible to form an independent beam per subcarrier. Accordingly, the digital beamforming method can optimize a maximum single user transfer rate based on enhanced beam gain and system capacity enhancement. Therefore, in a current 3G/4G system, digital beamforming based MIMO technology has been introduced.

Next, a massive MIMO environment in which the number of transmit/receive antennas is significantly increased will be described.

In general, in cellular communication, assume that a maximum number of transmit/receive antennas applied to the MIMO environment is 8. However, as massive MIMO has evolved, the number of antennas may be increased to several tens of antennas or several hundred antennas. If digital beamforming technology is applied in the massive MIMO environment, since signal processing for several hundreds of antennas for digital signal processing of a transmission end is performed through a BB process, signal processing complexity is significantly increased. In addition, since RF chains corresponding in number to the number of antennas are required, hardware implementation complexity is significantly increased.

In addition, since independent channel estimation of all antennas is required and feedback information of a massive MIMO channel including all antennas is required in a frequency division duplex (FDD) system, pilot and feedback overhead are significantly increased. In contrast, if analog beamforming technology is applied in the massive MIMO environment, hardware complexity of a transmission end is relatively low, but performance increase due to use of multiple antennas is insignificant and resource assignment flexibility is lowered. In particular, it is difficult to control a beam per frequency upon broadband transmission.

Accordingly, in the massive MIMO environment, instead of exclusively selecting only one of the analog beamforming method and the digital beamforming method, a method of configuring a hybrid transmission end which is a combination of an analog beamforming structure and a digital beamforming structure is necessary. That is, as shown in Table 1 below, using a relationship between performance gain and complexity of an analog beamforming method and a digital beamforming method, a hybrid transmission end capable of decreasing hardware implementation complexity thereof and maximizing beamforming gain using a massive antenna array needs to be designed.

Figure 3:
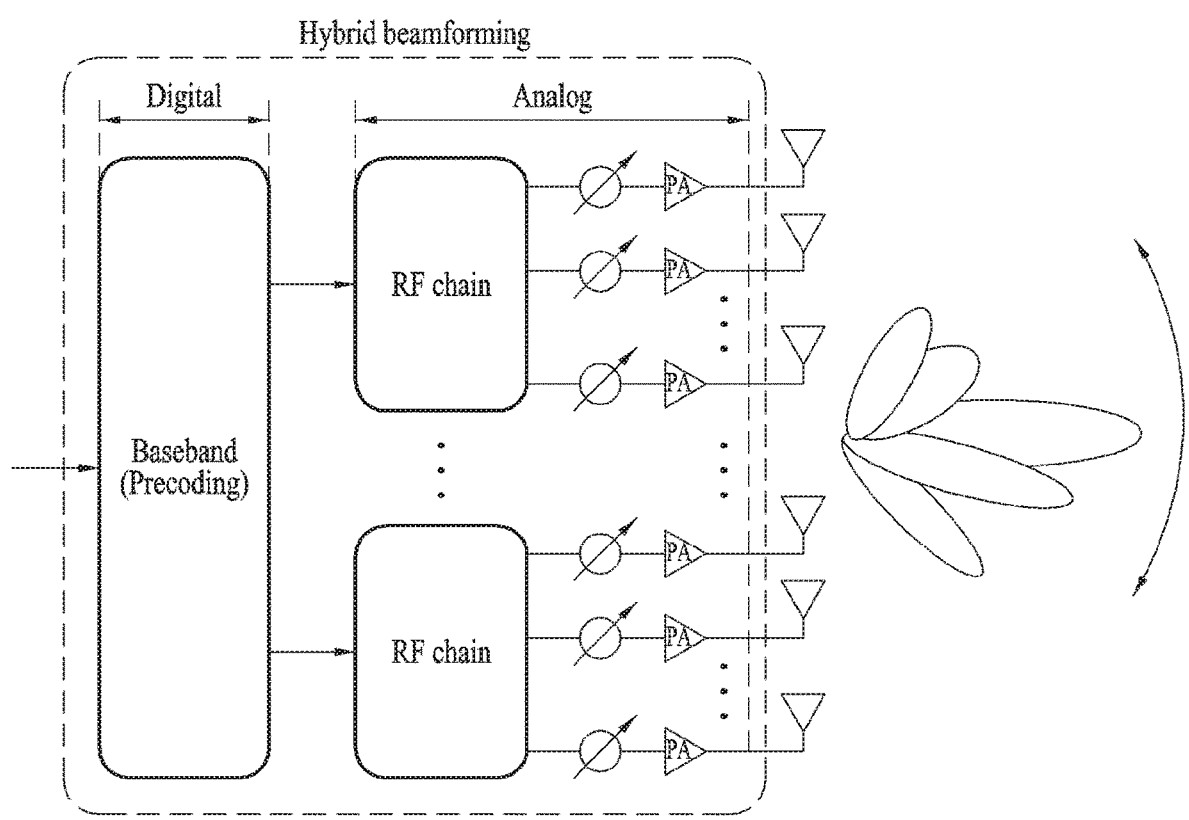
FIG. 3 is a block diagram showing a transmission end including a hybrid beamformer.

As shown in FIG. 3, a hybrid beamforming method may be configured to perform coarse beamforming using an analog beamforming method and to perform multi-stream or multi-user transmission using a digital beamforming method.

As a result, a hybrid beamforming method is obtained by simultaneously utilizing the analog beamforming method and the digital beamforming method in order to decrease implementation complexity or hardware complexity of the transmission end. Fundamentally, technical issues of the hybrid beamforming method will now be described.

(1) Difficulty in Optimization of Analog/Digital Beamforming Design

Optimization simultaneously considering analog beamforming and digital beamforming has the following difficulties. Fundamentally, a beamforming method is independently applicable per user using the same time-frequency resources in digital beamforming but a common beamforming method should be applied using the same time-frequency resources in analog beamforming. Accordingly, this restricts optimization of the number of supportable ranks, beam control flexibility and beamforming resolution.

For example, there are problems such as 1) maximum rank restriction according to the number of RF chains, 2) difficulty in subband beam control by RF beamformer and 3) beam resolution/granularity segmentation problems.

(2) Necessity of Embodying Common Signal Transmission Method

In the analog beamforming method for forming a beam only in a specific direction using the same time-frequency resources, it is impossible to simultaneously form a plurality of beams in all UE directions. Accordingly, common signals such as an uplink/downlink control channel, a reference signal (RS), a broadcast channel, a synchronous signal, etc. cannot be simultaneously transmitted to all UEs distributed in an entire area of a cell. In addition, problems may be caused in transmission of an uplink RACH channel, a sounding reference signal, a physical uplink control channel (PUCCH), etc.

(3) Necessity for Additional Pilot and Feedback Design for Analog/Digital Beamforming If analog/digital beam estimation is performed, a digital beam may use an existing orthogonal pilot assignment scheme without change but an analog beam requires a predetermined time-duration corresponding to the number

TABLE 1

|  | Beamforming accuracy control ease | Multi-carrier beam control | Multi-stream transmission | Hardware complexity (BB process) | Pilot and feedback overhead |
|---|---|---|---|---|---|
| Analog beamforming method | low (relationship PA/PS device characteristics) | Impossible or difficult | Impossible or difficult | Low | Low |
| Digital beamforming method | high | Possible | Possible | High | High |

1.2 Hybrid Beamforming

The purpose of hybrid beamforming is to configure a transmission end having merits of an analog beamforming method and a digital beamforming method while decreasing hardware complexity in a massive MIMO environment.

FIG. 3 is a block diagram showing a transmission end including a hybrid beamformer.

of beam candidates. This means that time delay for analog beam estimation is large and complexity is significantly increased when an analog beam is estimated simultaneously with a digital beam.

For example, system loss may be caused due to increase in time delay for analog beam estimation and beam estimation complexity may be increased due to increase in combinations of analog and digital beams.

(4) Difficulty in Supporting Analog Beam Based SDMA and FDMA

In the digital beamforming method, beamforming for multi-user/stream is freely performed. However, in the analog beamforming method, since the same beamforming is performed with respect to an entire transmission band, it is difficult to independently perform beamforming per user or per stream. In particular, since it is difficult to support FDMA via orthogonal frequency resource assignment, it is difficult to optimize frequency resource efficiency.

For example, it may be difficult to support orthogonal frequency division multiple access (OFDMA) for supporting multiple access due to difficulty in independent beamforming per user in the frequency domain at the same time and to support single user-MIMO (SU-MIMO) for supporting multiple streams due to difficulty in independent beamforming per stream at the same frequency-time. In addition, it may be difficult to support multi user-MIMO (MU-MIMO) for supporting multiple users due to difficulty in independent beamforming per user at the same frequency-time In order to solve such technical issues, the embodiments of the present invention provide methods for solving analog/digital beam estimation complexity for hybrid beamforming.

1.3 Hybrid Beamforming System Model

Figure 4:
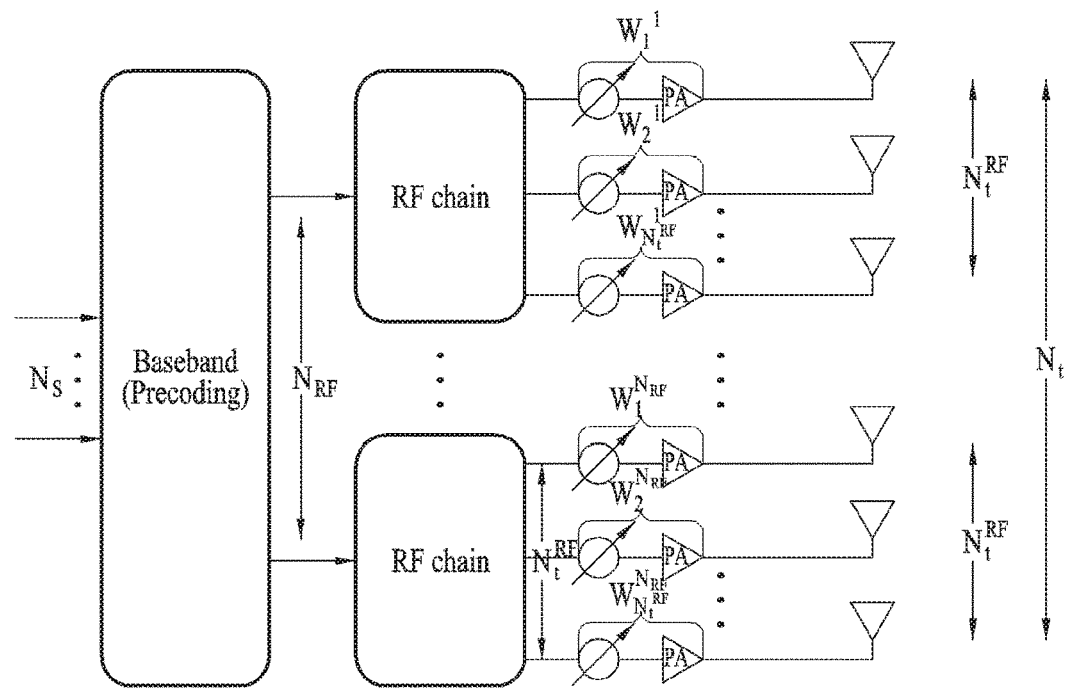
FIG. 4 is a diagram showing an example of the structure of a hybrid beamformer configured in a basic transmission end.

FIG. 4 is a diagram showing an example of the structure of a hybrid beamformer configured in a basic transmission end.

As shown in FIG. 4, a transmission end structure including only $N_t^{RF}$ independent antennas per RF chain may be assumed. Accordingly, a relationship between the total number of antennas and the number of antennas per RF chain is $N_t = N_t^{RF} \times N_{RF}$. Finally, since a signal passing through a phase shifter (PS) and a power amplifier (PA) per RF chain is independently sent to a transmit antenna, a matrix type system model shown in Equation 1 below may be derived.

$$y_k = H_k F^{RF} F_k^{BB} s_k + z_k \quad \text{[Equation 1]}$$

In Equation 1, $y_k$ denotes a received signal vector $N_r \times 1$ at a k-th subcarrier, $H^k$ denotes an $N_r \times N_t$ channel of the k-th subcarrier, $F^{RF}$ denotes an $N_r \times N_t$ RF precoder equally configured in all subcarriers, and $F_k^{BB}$ denotes an $N_{RF} \times N_S$ baseband precoder at the k-th subcarrier, which is changeable according to subcarrier. In addition, $s_k$ denotes a transmitted signal vector $N_S \times 1$ at the k-th subcarrier and $z_k$ denotes a noise signal vector $N_r \times 1$ at the k-th subcarrier.

At this time, k denotes a subcarrier index (k=0, 1, 2, ..., $N_{FFT}$−1) $N_{FFT}$ denotes the total number of subcarriers as a Fast Fourier Transform (TTF) size and $N_{RF}$ denotes the total number of RF chains.

In addition, $N_t$ denotes the total number of antennas of the transmission end, $N_t^{RF}$ denotes the number of transmit antennas included per RF chain, $N_r$ denotes the total number of antennas of the reception end, and $N_s$ denotes the number of streams of transmitted data.

At this time, Equation 2 below may be obtained by solving Equation 1 with respect to a subcarrier k.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} F^{RF} \quad \text{[Equation 2]}$$

$$\left( \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(N_r)} \end{bmatrix}$$

In Equation 2, an analog beamforming equivalent precoding matrix $F^{RF}$ ($N_t \times N_{RF}$ matrix) obtained by a phase shifter and PA for changing the phase of a beam after an RF chain may be defined as shown in Equation 3 below.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \quad \text{[Equation 3]}$$

In addition, a precoding weight per RF chain of the RF precoding matrix $F^{RF}$ may be defined as shown in Equation 4 below.

$$w_{N_t^{RF}}^j = \begin{bmatrix} w_1^j \\ w_2^j \\ \vdots \\ w_{N_t^{RF}}^j \end{bmatrix} \quad \text{[Equation 4]}$$

Figure 5:
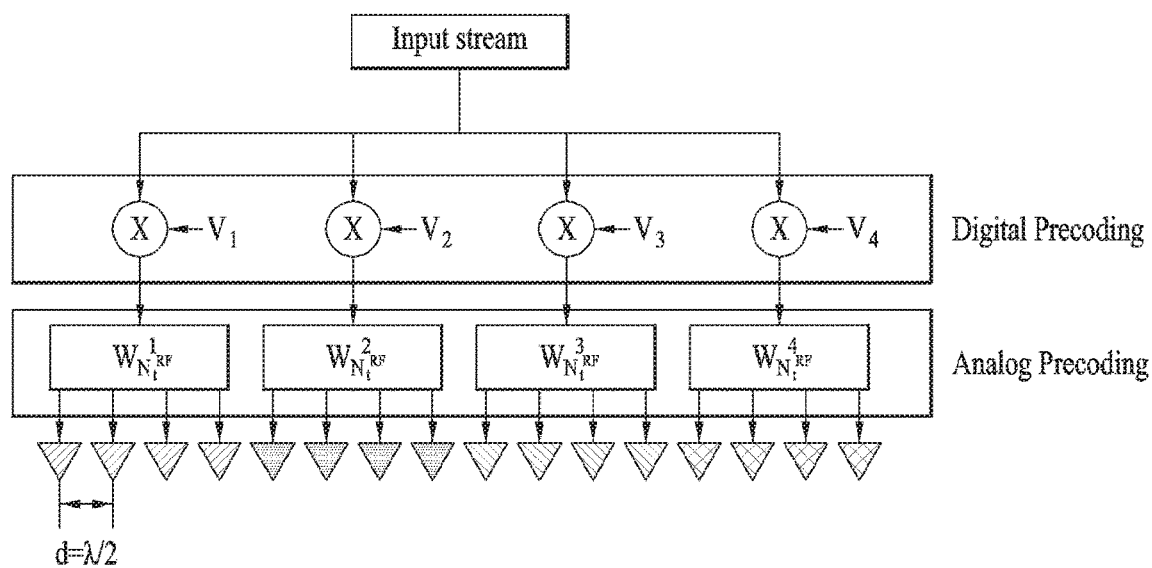
FIG. 5 is a diagram showing a 16-ULA antenna structure including four RF chains.

1.4 Beam Radiation Pattern of Hybrid Beamformer (BF) for Uniform Linear Array (ULA) Antenna FIG. 5 is a diagram showing a 16-ULA antenna structure including four RF chains.

An array response vector of a ULA antenna may be defined as shown in Equation 5 below.

$$a(\theta) = \left[ 1 \ \exp\left(j2\pi \times 1 \times \frac{d}{\lambda}\sin(\theta)\right) \ \exp\left(j2\pi \times 2 \times \frac{d}{\lambda}\sin(\theta)\right) \ \cdots \ \exp\left(j2\pi \times (N_t - 1) \times \frac{d}{\lambda}\sin(\theta)\right) \right]^T \quad \text{[Equation 5]}$$

where, λ denotes a wavelength and d denotes a distance between antennas. In order to indicate the antenna radiation pattern of the hybrid beamformer, for convenience, assume that the number of RF chains is 4 and the number of analog antennas per RF chain is 4. Such a beamformer is shown in FIG. 5. At this time, the total number of transmit antennas is 16 and the distance between antennas is d=λ/λ.

At this time, the PS and the PA of the analog terminal may be represented by an equivalent beamforming weight and may be defined as shown in Equation 6 below.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad w^j_{N_t^{RF}} = \begin{bmatrix} w^j_1 \\ w^j_2 \\ w^j_3 \\ w^j_4 \end{bmatrix} \qquad \text{[Equation 6]}$$

At this time, an arbitrary rank-1 weight vector applied in a digital beamforming stage may be defined as shown in Equation 7 below.

$$F^{BB} = v_1 = [v_1 v_2 v_3 v_4]^T \qquad \text{[Equation 7]}$$

An antenna array response vector, to which analog beamforming of Equation 6 and digital beamforming of Equation 7 are applied, may be expressed by Equation 8 below. At this time, assume that the distance between the antennas is $d=\lambda/2$. Each antenna array response vector may be expressed by a sum of all vector elements.

$$\sum a(\theta) = \sum_{i=0}^{15} a_i(\theta) = \qquad \text{[Equation 8]}$$
$$(1 \cdot w_1^1 + \exp(j\pi \times \sin(\theta)) \cdot w_1^2 + \exp(j2\pi \times \sin(\theta)) \cdot w_1^3 +$$
$$\exp(j3\pi \times \sin(\theta)) \cdot w_1^4) \times v_1 +$$
$$(\exp(j\pi 4 \times \sin(\theta)) \cdot w_2^1 + \exp(j\pi 5 \times \sin(\theta)) \cdot w_2^2 +$$
$$\exp(j\pi 6 \times \sin(\theta)) \cdot w_2^3 + \exp(j\pi 7 \times \sin(\theta)) \cdot w_2^4) \times$$
$$v_2 + (\exp(j\pi 8 \times \sin(\theta)) \cdot w_3^1 + \exp(j\pi 9 \times \sin(\theta)) \cdot w_3^2 +$$
$$\exp(j\pi 10 \times \sin(\theta)) \cdot w_3^3 + \exp(j\pi 11 \times \sin(\theta)) \cdot w_3^4) \times$$
$$v_3 + (\exp(j\pi 12 \times \sin(\theta)) \cdot w_4^1 + \exp(j\pi 13 \times \sin(\theta)) \cdot w_4^2 +$$
$$\exp(j\pi 14 \times \sin(\theta)) \cdot w_4^3 +$$
$$\exp(j\pi 15 \times \sin(\theta)) \cdot w_4^4) \times v_4$$

At this time, an analog beamforming weight may be set as shown in Equation 9 below. This is an analog beamforming weight setting method which is generally applied in order to set boresight through analog beamforming.

$$w_1^1 = \begin{bmatrix} 1 \\ e^{-j\pi \sin(\phi)} \\ e^{-j\pi 2\sin(\phi)} \\ e^{-j\pi 3\sin(\phi)} \end{bmatrix}, \qquad \text{[Equation 9]}$$

$$w_2^1 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w_3^1 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\phi)} \end{bmatrix} = e^{j\pi 8\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w_4^1 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

If Equation 8 is simplified using Equation 9, Equation 10 below can be obtained.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4) \qquad \text{[Equation 10]}$$

Equation 11 below is obtained by generalizing Equation 10.

$$\sum a(0) = (1 + \exp(j\pi[\sin(0) - \sin(\phi)]) + \qquad \text{[Equation 11]}$$
$$\ldots + \exp(j\pi(N_t^{RF} - 1) \cdot [\sin(0) - \sin(\phi)])) \times$$
$$(v_1 + \exp(j\pi \cdot (N_t^{RF}) \cdot [\sin(0) - \sin(\phi)]) \cdot v_2 + \ldots +$$
$$\exp(j\pi \cdot [N_t^{RF} \cdot (N_{RF} - 1)] \cdot [\sin(0) - \sin(\phi)]) \cdot$$
$$v_{N_{RF}}) = \left(\sum_{i=1}^{N_t^{RF}} s_i\right) \times \left(\sum_{i=1}^{N_{RF}} t_i\right) = \sum s \times \sum t$$

where, $\phi$ denotes a degree for determining analog beamforming. For example, if $\phi=30°$ or $\pi/6$ is set, a beamforming direction having maximum beam gain at $\theta=30°$ or $\pi/6$ is set.

Figure 6:
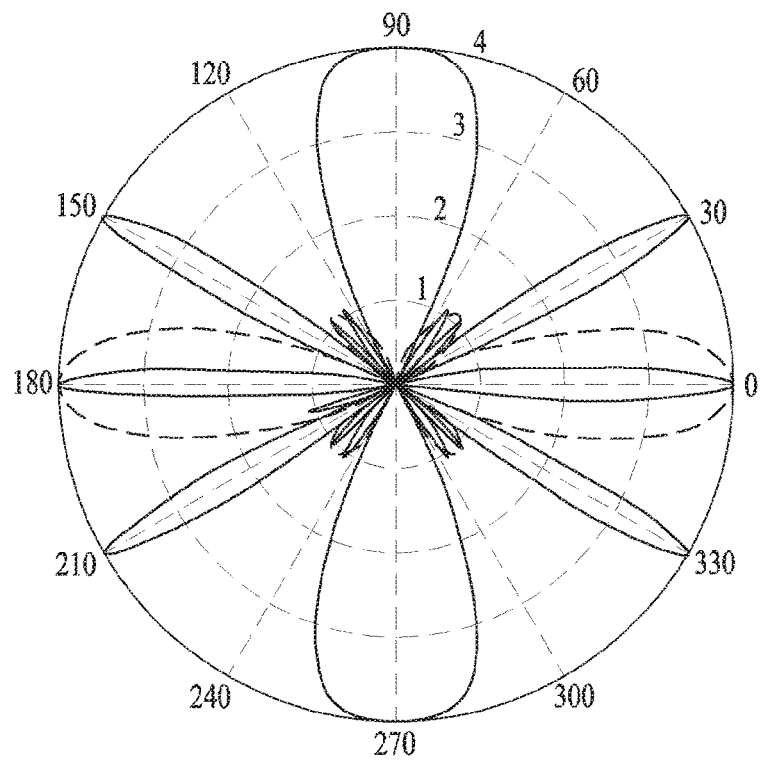
FIG. 6 is a diagram showing an example of a beam pattern of a beam bound vector and a beam steering vector.
Figure 7:
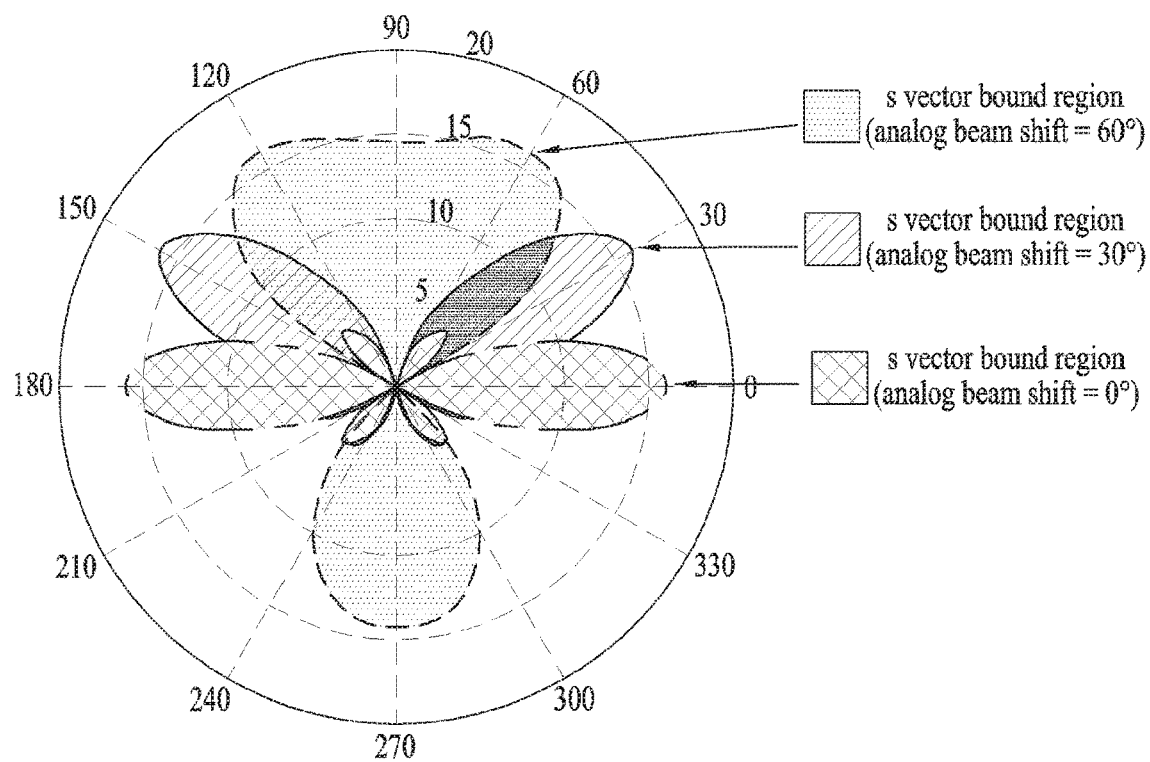
FIG. 7 is a diagram showing a final antenna array response according to analog beam shift.

In addition, a beam bound vector S determines an entire valid range and a digital beamforming range is restricted to a corresponding region. FIG. 6 is a diagram showing an example of a beam pattern of a beam bound vector and a beam steering vector. FIG. 7 is a diagram showing a final antenna array response according to analog beam shift.

Referring to FIG. 6, the beam bound vector s is denoted by a dotted line and beam gain and a beam steering vector t are denoted by a solid line. Finally, a cumulative beam pattern result of applying all vectors $v_1=[v_1 \ v_2 \ v_3 \ v_4]^T$ for determining digital beamforming is shown in FIG. 7. That is, it can be seen that a valid beam range is restricted to the beam bound vector s.

1.5 Digital Beam Coefficient Setting Method Considering Analog Beam Coefficient

As described above, a beam pattern of hybrid beamforming is represented by the total number $N_{RF}$ of RF chains and the number $N_t^{RF}$ of analog antennas per RF chain as shown in Equation 11. Here, the weight vector of a digital beamforming coefficient has a length of $1 \times N_{RF}$. Here, a final beam direction is a combination of an analog beam weight and a digital beam weight. Problems which may occur upon applying digital beamforming without pre-compensating for analog beamforming will now be described. In addition, hereinafter, for convenience of description, a description will be given based on Equation 10 ($N_t=16$, $N_t^{RF}=4$, $N_{RF}=4$)). At this time, the digital beamforming weight $v=[v_1 \ v_2 \ v_3 \ v_4]^T$ of Equation 10 may be designed as shown in Equation 12 below.

$$v = \begin{bmatrix} v_1 \\ v_2 \\ v_3 \\ v_4 \end{bmatrix} = \begin{bmatrix} 1 \\ e^{-j\pi 4 \sin(\psi)} \\ e^{-j\pi 8 \sin(\psi)} \\ e^{-j\pi 12 \sin(\psi)} \end{bmatrix} \quad \text{[Equation 12]}$$

Equation 13 below may be obtained by generalizing Equation 12.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot \sin(\psi)} \\ \vdots \\ e^{-j\pi \cdot N_t^{RF} \cdot (N_{RF}-1) \cdot \sin(\psi)} \end{bmatrix} \quad \text{[Equation 13]}$$

In Equation 12 and 13, a final array response vector considering a digital beamforming angle $\psi$ may be defined as shown in Equation 14 below.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times \{(1 + \exp(j\pi 4[\sin(\theta) - \sin(\phi) - \sin(\psi)]) + \exp(j\pi 8[\sin(\theta) - \sin(\phi) - \sin(\psi)]) + \exp(j\pi 12[\sin(\theta) - \sin(\phi) - \sin(\psi)]))\} \quad \text{[Equation 14]}$$

In Equation 14, $[\sin(\theta) - \sin(\phi) - \sin(\psi)]$ between brackets determines a final beamforming angle. That is, by adjusting $\sin(\phi)$ through analog beamforming and controlling $\sin(\psi)$ through digital beamforming, $\sin(\theta)$ having maximum beam gain is finally adjusted. At this time, if boresight is set to $\phi=30°$ through analog beamforming and $\psi=5°$ is set through digital beamforming for fine tuning, Equation 14 is finally changed to Equation 15.

$$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(30°) - \sin(5°)]) + \exp(j\pi 8[\sin(\theta) - \sin(30°) - \sin(5°)]) + \exp(j\pi 12[\sin(\theta) - \sin(30°) - \sin(5°)])) \quad \text{[Equation 15]}$$

As a result, an angle having maximum beam gain is $\theta$ satisfying $\sin(\theta) - \sin(30°) - \sin(5°) = 0$. That is, in beamforming, assume that the beam may be finally shifted by 35° shifting the beam by 30° through analog beamforming and shifting the beam by 5° through digital beamforming. However, $\theta$ satisfying $\sin(\theta) - \sin(30°) - \sin(5°) = 0$ is not accurately 35°. That is, a relationship of $\theta \approx \phi + \psi$ is approximately satisfied. However, in this case, as a beam control range by analog/digital beamforming increases, since a beamforming setting angle satisfying $\sin(\theta) = \sin(\phi) + \sin(\psi)$ has a relationship of $\theta \approx \phi + \psi$, the above assumption is no longer valid.

Accordingly, the present invention provides methods of accurately performing beam control by performing pre-compensation with respect to analog beamforming upon performing digital beamforming. That is, a digital beamforming coefficient may be set based on Equation 16 below.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix} = \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix} \quad \text{[Equation 16]}$$

$\oplus$: Hadamard product

In Equation 16, $$\begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix}$$

serves to pre-compensate for the analog beam and $$\begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

corresponds to a final digital beam.

A method of setting a final direction of a digital beam will now be described. For example, in an environment of $N_t=16$, $N_t^{RF}=4$, $N_{RF}=4$, in order to rotate all beams by $\phi=30°$ through analog beamforming and further rotate the beams by $\psi=5°$ through digital beamforming to set a final beam direction to 35°, a method of designing a digital beamforming coefficient may be defined as shown in Equation 17 below.

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \quad \text{[Equation 17]}$$

-continued $$\begin{bmatrix} 1 \\ e^{-j\pi \cdot 4 \cdot 1 \cdot sin(35°)} \\ e^{-j\pi \cdot 4 \cdot 2 \cdot sin(35°)} \\ e^{-j\pi \cdot 4 \cdot 3 \cdot sin(35°)} \end{bmatrix} = \begin{bmatrix} 1 \\ e^{j\pi \cdot 4 \cdot sin(30°)} \\ e^{j\pi \cdot 8 \cdot sin(30°)} \\ e^{j\pi \cdot 12 \cdot sin(30°)} \end{bmatrix} \oplus \begin{bmatrix} 1 \\ e^{-j\pi \cdot 4 \cdot sin(35°)} \\ e^{-j\pi \cdot 8 \cdot sin(35°)} \\ e^{-j\pi \cdot 12 \cdot sin(35°)} \end{bmatrix}$$

A final antenna array response vector obtained by applying the digital coefficient of Equation 16 to Equation 10 may be defined as shown in Equation 18 below.

$$\sum a(\theta) = \qquad \text{[Equation 18]}$$
$$(1 + \exp(j\pi[\sin(\theta) - \sin(\phi)]) + \exp(j\pi 2[\sin(\theta) - \sin(\phi)]) +$$
$$\exp(j\pi 3[\sin(\theta) - \sin(\phi)])) \times$$
$$(v_1 + \exp(j\pi 4[\sin(\theta) - \sin(\phi)]) \cdot v_2 +$$
$$\exp(j\pi 8[\sin(\theta) - \sin(\phi)]) \cdot v_3 +$$
$$\exp(j\pi 12[\sin(\theta) - \sin(\phi)]) \cdot v_4) =$$
$$(1 + \exp(j\pi[\sin(\theta) - \sin(\phi)]) + \exp(j\pi 2[\sin(\theta) - \sin(\phi)]) +$$
$$\exp(j\pi 3[\sin(\theta) - \sin(\phi)])) \times$$
$$(1 + \exp(j\pi 4[\sin(\theta) - \sin(\phi) + \sin(\phi) - \sin(\phi + \psi)]) +$$
$$\exp(j\pi 8[\sin(\theta) - \sin(\phi) + \sin(\phi) - \sin(\phi + \psi)]) +$$
$$\exp(j\pi 12[\sin(\theta) - \sin(\phi) + \sin(\phi) - \sin(\phi + \psi)])) =$$
$$(1 + \exp(j\pi[\sin(\theta) - \sin(\phi)]) + \exp(j\pi 2[\sin(\theta) -$$
$$\sin(\phi)]) + \exp(j\pi 3[\sin(\theta) - \sin(\phi)])) \times$$
$$(1 + \exp(j\pi 4[\sin(\theta) - \sin \phi + (\psi)]) +$$
$$\exp(j\pi 8[\sin(\theta) - \sin(\phi + \psi)]) +$$
$$\exp(j\pi 12[\sin(\theta) - \sin(\phi + \psi)]))$$

In Equation 18, in the case of φ=30°, if a final beamforming rotation angle is set to 35° by applying ψ=+5°, Equation 19 is obtained.

$$\Sigma a(\theta) = (1 + \exp(j\pi 4[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(35°)]) + \exp(j\pi 8[\sin(\theta) - \sin(35°)]) + \exp(j\pi 12[\sin(\theta) - \sin(35°)]))$$ [Equation 19]

Figure 8:
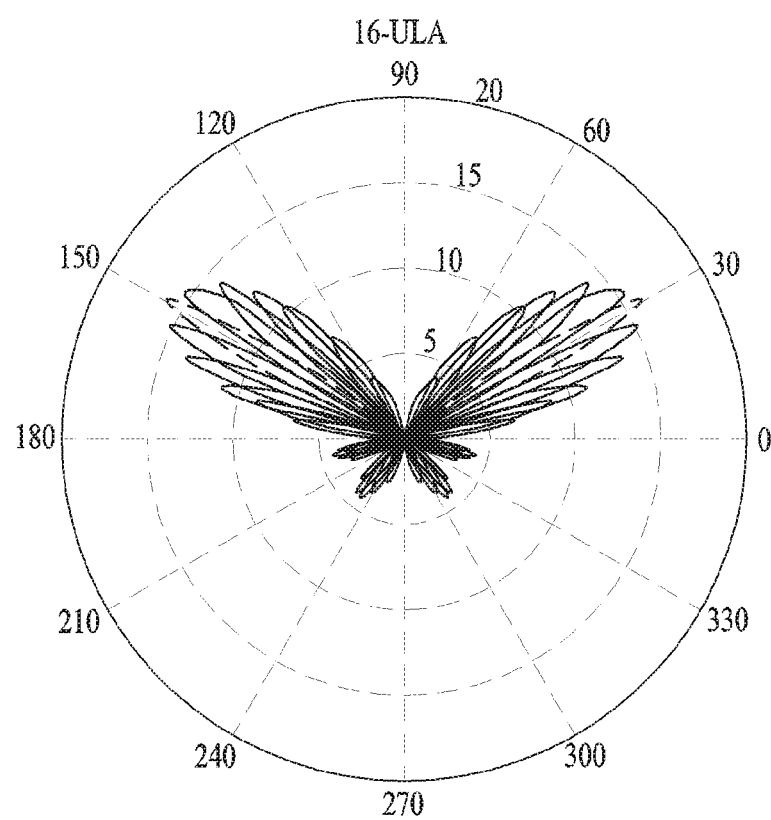
FIG. 8 is a diagram showing an antenna array response, to which digital beamforming coefficient design is applied.

If digital beamforming is performed with respect to ψ=±5°, ±10°, ±15°, the beam shape of the final antenna array response vector shown in FIG. 8 is obtained. FIG. 8 is a diagram showing an antenna array response, to which digital beamforming coefficient design is applied.

Referring to the result shown in FIG. 8, accurate beam control of the hybrid beamformer is possible through such a digital beamforming coefficient design method.

1.6 Problems of Analog Beam Scanning

Generally, an analog beamforming employed transmission/reception structure includes a pure analog beamforming transmitting/receiving end and a hybrid beamforming transmitting/receiving end. Analog beamforming is normally capable of estimation of a single beam in the same time. Hence, a training time required for beam scanning is proportional to the total number of beam candidates.

Pure analog beamforming needs a beam scanning process in a time domain for transmitting/receiving end beam estimation as well. Namely, a time of $K_T \times K_R$ (i.e., # of Tx beams×# of Rx beams) is necessary for analog beam estimation. Assuming that a time $t_s$ is set for a single beam scanning, an estimated time $T_s$ for total Tx/Rx beams can be expressed as the following Equation.

$$T_S = t_s \times (K_T \times K_R) \qquad \text{[Equation 20]}$$

Figure 9:
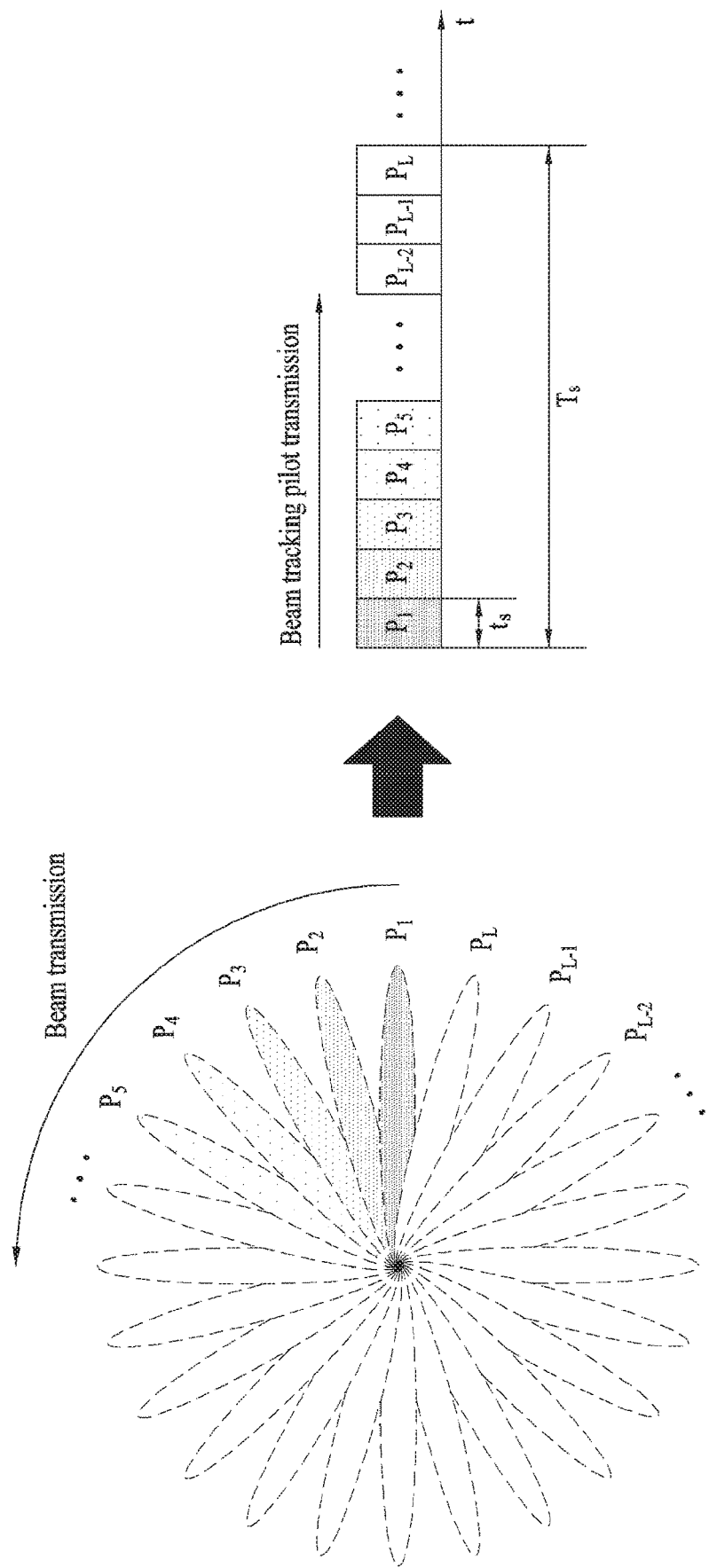
FIG. 9 is a diagram to describe a beam estimation interval in a time domain required for analog beam tracking.

For instance, assuming that the total number $K_T$ of Tx beams of a transmitting end is L (i.e., $K_T$=L) and that the number $K_R$ of Rx beams of a receiving end is 1 (i.e., $K_T$=1), the total number of beam candidates becomes total L, whereby L time intervals are necessary in a time domain. For instance, as shown in FIG. 9, it can be observed that estimation of 1 beam is possible in a single time interval for analog beam estimation and that L time intervals are necessary for estimation of total L beams. If an analog beam estimation process is ended, a UE feeds back a beam ID having highest signal strength to a BS. FIG. 9 is a diagram to describe a beam estimation interval in a time domain required for analog beam tracking. Referring to FIG. 9, if the number of individual beams increases more due to the increment of the number of Tx/Rx antennas in an mmWave system, it can be observed that a longer training time is necessary.

Thus, analog beamforming changes a size and phase angle of a continuous waveform in a time domain after DAC. Hence, unlike digital beamforming, it is preferable that a training interval for an individual beam is secured. Yet, if the training interval gets longer, a loss of a system increases more. When a UE moves and a channel is changed, if additional beam scanning is performed, the system loss may further increase.

Actual beam scanning methods may include an exhaustive search and a multi-level search (or a hybrid search).

Regarding the exhaustive search, when a beamwidth is 1 degree in case of a 2-dimensional (2D) structure, 360 search spaces are necessary. When a beamwidth is 5 degrees, 72 search spaces are necessary. When a beamwidth is 10 degrees, 36 search spaces are necessary. In case of a 3-dimensional (3D) structure, when beamwidths are 1 degree, 5 degrees and 10 degrees, 129,600, 5,184 and 1,296 search spaces are necessary, respectively.

Regarding the multi-level search, in case of a 2D structure, when a beamwidth is 1 degree, 8 coarse beams and 45 fine beams are necessary. When a beamwidth is 10 degrees, 8 coarse beams and 4.5 fine beams are necessary. If this is extended to a 3D structure, when a beamwidth is 1 degree, 64 coarse beams and 2,045 fine beams are necessary. When a beamwidth is 10 degrees, 6 coarse beams and 20.25 fine beams are necessary.

The feedback of a receiving end for the exhaustive search includes a best Tx beam ID. The feedback for the multi-level search includes a best sector beam ID for a coarse beam and a best fine beam ID.

At an analog beamforming end for which a beam training interval is necessary in a hybrid beamformer, a training time increases in proportion to a search space of a beam. Since it is expected that a sharper beam will be generated owing to the increased physical antennas of a transmitting/receiving end in the future, considering a Tx/Rx beam band and an antenna structure changed into 3D channel from the existing 3D channel, a beam search space increases like Table 2 and a search time increases like Table 3.

TABLE 2

| Beamwidth | | 1° | 2° | 5° | 10° |
|---|---|---|---|---|---|
| 2D | Search space | 360 | 180 | 72 | 36 |
|  | Exhaustive candidates (Tx beam + Rx beam) | $360^2$ | $180^2$ | $72^2$ | $36^2$ |
| 3D | Search space | 129,600 | 32,400 | 5,184 | 1,296 |
|  | Exhaustive candidates (Tx beam + Rx beam) | $129,600^2$ | $32,400^2$ | $5,184^2$ | $1,296^2$ |

TABLE 3

| Beamwidth | 1° | 2° | 5° | 10° |
|---|---|---|---|---|
| 2D Search space (Tx beam + Rx beam) | 720 | 360 | 144 | 72 |
| Exhaustive search time | 5.37 s | 1.34 s | 215.0 ms | 53.8 ms |

It is difficult to directly change a beam scanning time for beamwidth/resolution through the multi-level beam training method employed by the respective standard technologies such as IEEE 802.15.3c, IEEE 802.11ad and the like. Yet, when Table 2 and Table 3 are referred to, if a tough time is estimated with reference to an exhaustive search time, it can be observed that a search time increases 100 times when a search space increases 10 times [Case of 2D].

1.7 Short Time Change and Obstacles for mmWave Channel

In mmWave system, a blockage generation rate of each cluster may appear differently together with a rapid loss (average 10~15 dB, maximum 40 dB or higher) due to a movement of a human obstacle. Moreover, according to a change of an Rx antenna or an Rx beamforming of a receiver, a blockage rate of each cluster may be changed. Such phenomena can be represented as a change of a relatively short term of an mmWave link.

Figure 10:
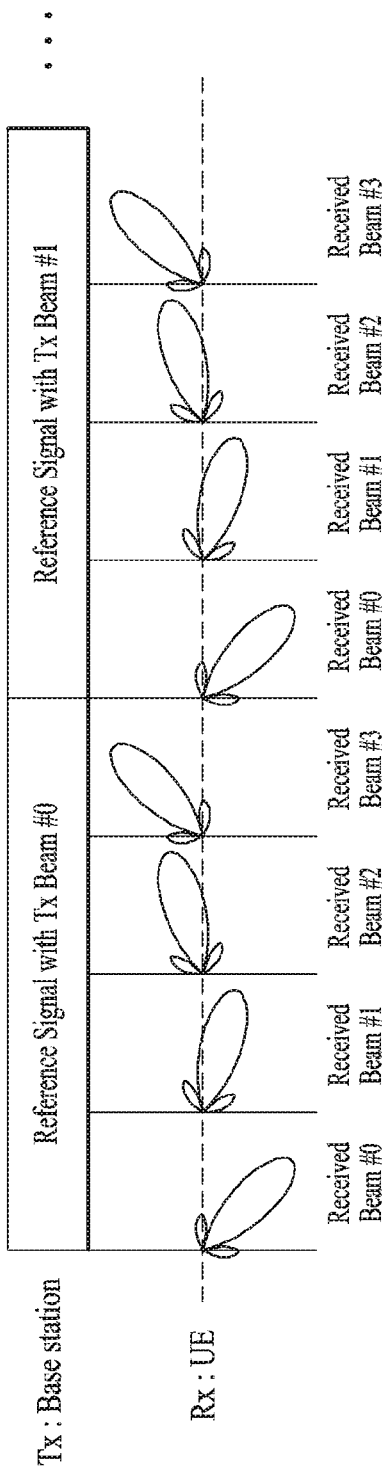
FIG. 10 is a diagram to describe a beam scanning process performed by a transmitting end and a receiving end.

As described above, in case that both a base station and a UE perform analog beamforming, the base station should perform an analog beam scanning process for Tx beam configuration in downlink transmission and the UE should perform an analog beam scanning process for Rx beam configuration. As one of methods for performing such a process, as shown in FIG. 10, while a base station transmits a preamble (or, a reference signal, a pilot signal, etc.) for a multitude of Tx beam candidates, a UE can find an optimal pair of Tx and Rx beams by applying Rx beam candidates. Preferably, Tx beam information, which is to be applied by the base station, among optimal Tx/Rx beam informations is fed back to the base station. This is described in detail with reference to FIG. 10.

FIG. 10 is a diagram to describe a beam scanning process performed by a transmitting end and a receiving end. Referring to FIG. 10, a transmitting end (e.g., Base Station (BS)) transmits a reference signal (or, a preamble, a pilot signal, etc.) together with Tx beam #0 and Tx beam #1. In doing so, a receiving end (e.g., User Equipment (UE)) can search for an Rx beam pair that matches each Tx beam y searching for an Rx beam. Hence, the receiving end can feed back a Tx beam ID and an Rx beam ID information that matches the Tx beam ID to the transmitting end.

The problem lies in that the above-configured Tx/Rx beam pair of the BS and UE may vary depending on a movement of the UE. A change of an optimal Tx beam may mainly occur by location movement of the UE or a blockage environment change around the UE, and a change of an optimal Rx beam may occur not only by a relatively long term change like the above description but also by a short term change like a rotation of the UE.

Particularly, in case of considering a handset type UE such as a smartphone, although a user slightly moves a hand by which the UE is held, as a reference shaft of the UE is changed, an optimal Rx beam should be changed. Eventually, scanning or tracking of an Rx beam should occur more frequently than scanning or tracking of a Tx beam. So to speak, when a time limit in which Tx beam scanning/tracking should occur is set to N and a time limit in which Rx beam scanning/tracking should occur is set to M, the relationship of 'M<N' is established.

2. Beam Scanning Method in mmWave System

Figure 11:
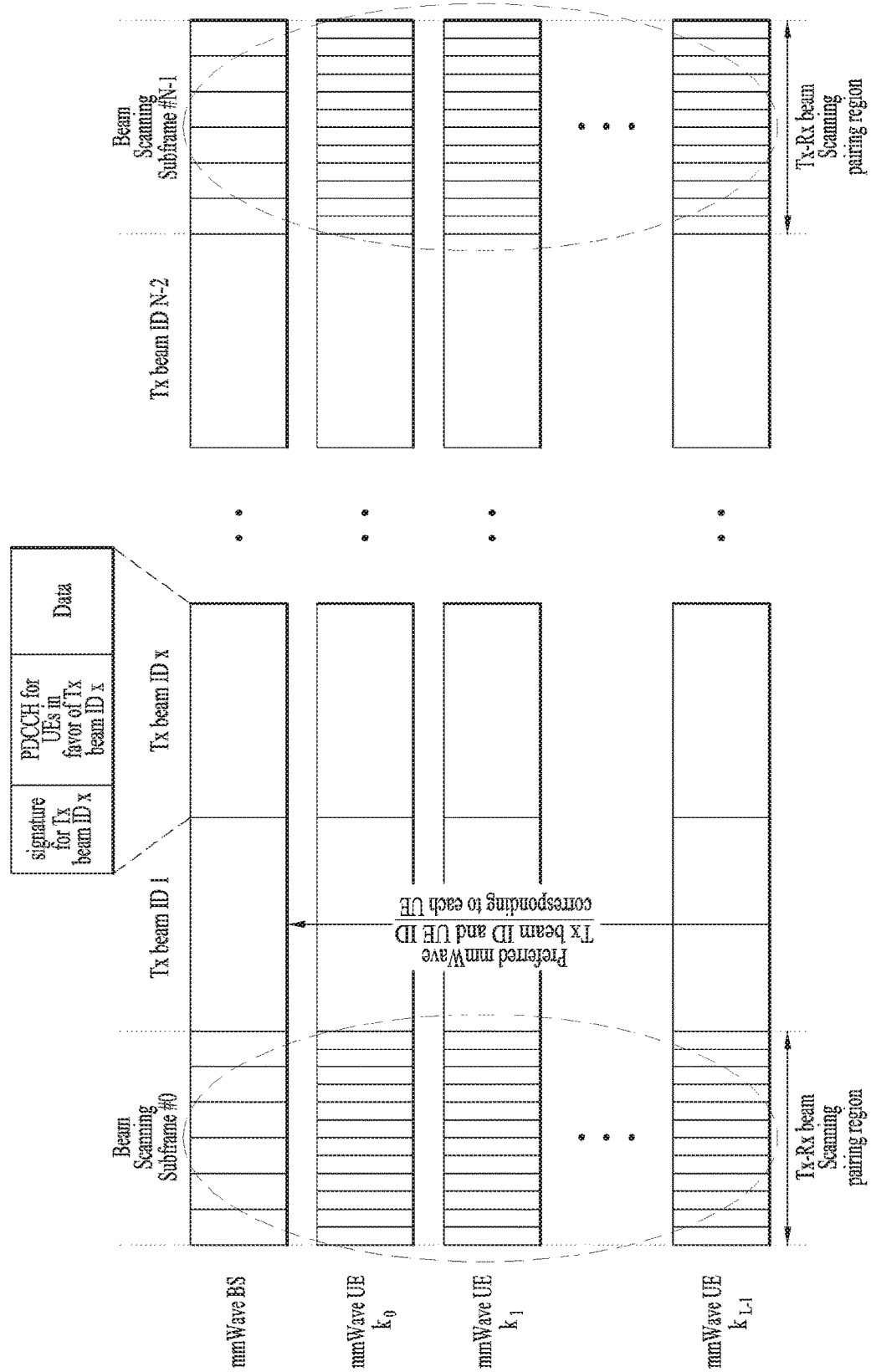
FIG. 11 is a diagram showing a beam scanning method performed in an mmWave system and one example of a corresponding resource allocation structure.

FIG. 11 is a diagram showing a beam scanning method performed in an mmWave system and one example of a corresponding resource allocation structure.

In order to perform mmWave beam scanning, as shown in FIG. 11, a beam scanning subframe can be defined. In this case, the beam scanning subframe may be defined through a higher layer signal (e.g., RRC, etc.). Moreover, the beam scanning subframe may be defined as a bundle of legacy subframes, a legacy RFN or slot unit, etc., and is defined to find an optimal Tx/Rx beam pair.

Each receiving end (e.g., UE) can scan a Tx-Rx beam scanning paring region by working to a period of a long term beam scanning subframe. Namely, according to embodiments of the present invention, the Tx-Rx beam scanning paring region may mean a subframe (or, frame, slot, etc.) for periodically configuring a preferred beam set between an mmWave UE and an mmWave BS.

Thereafter, the mmWave UE can feed back an optimal Tx beam ID and a UE ID to the mmWave BS (e.g., a transmitting end) in mmWave UL or legacy UL according to each scanning result. The mmWave BS can perform resource allocation scheduling by referring to the fed-back Tx beam ID and the UE ID corresponding thereto.

FIG. 11 shows a case that a long term beam scanning period is assigned in beam scanning subframe N unit. In this case, the rest of scanning subframes that are not the Tx-Rx beam scanning pairing region are the resource allocation region. Hence, the transmitting end transmits PDCCH containing resource allocation information for UEs preferring a corresponding Tx beam and data corresponding to the PDCCH together with a predetermined (e.g., RRC signaling) signature in a Tx beam direction corresponding to a Tx beam ID of the corresponding subframe. The signature relates to the Tx beam ID transmitted in the corresponding subframe, and an mmWave UE mapped to the corresponding Tx beam ID can receive the signature for the corresponding Tx beam ID only. Therefore, only a UE for a Tx-Rx beam pair matched beam can receive a corresponding signature, PDCCH and data in each scanning subframe.

Yet, since the method described in FIG. 11 relates to a long term scanning method, it is unable to flexibly cope with resource allocation according to a short term rapid change of a link generated from a receiving end. A method of overcoming a short term change in an mmWave system according to embodiments of the present invention is described as follows.

(1) A transmitting end can perform a link adaptive scheme according to an mmWave channel state through CQI feedback from a receiving end.

(2) The transmitting end can confirm the mmWave channel state. If a corresponding link is degraded, the transmitting end can find another mmWave link and then establish a new connection.

Embodiments of the present invention to which the above-described methods are applied shall be described in detail as follows.

2.1 Method of Configuring Short Term Rx Beam Scanning Interval

Figure 12:
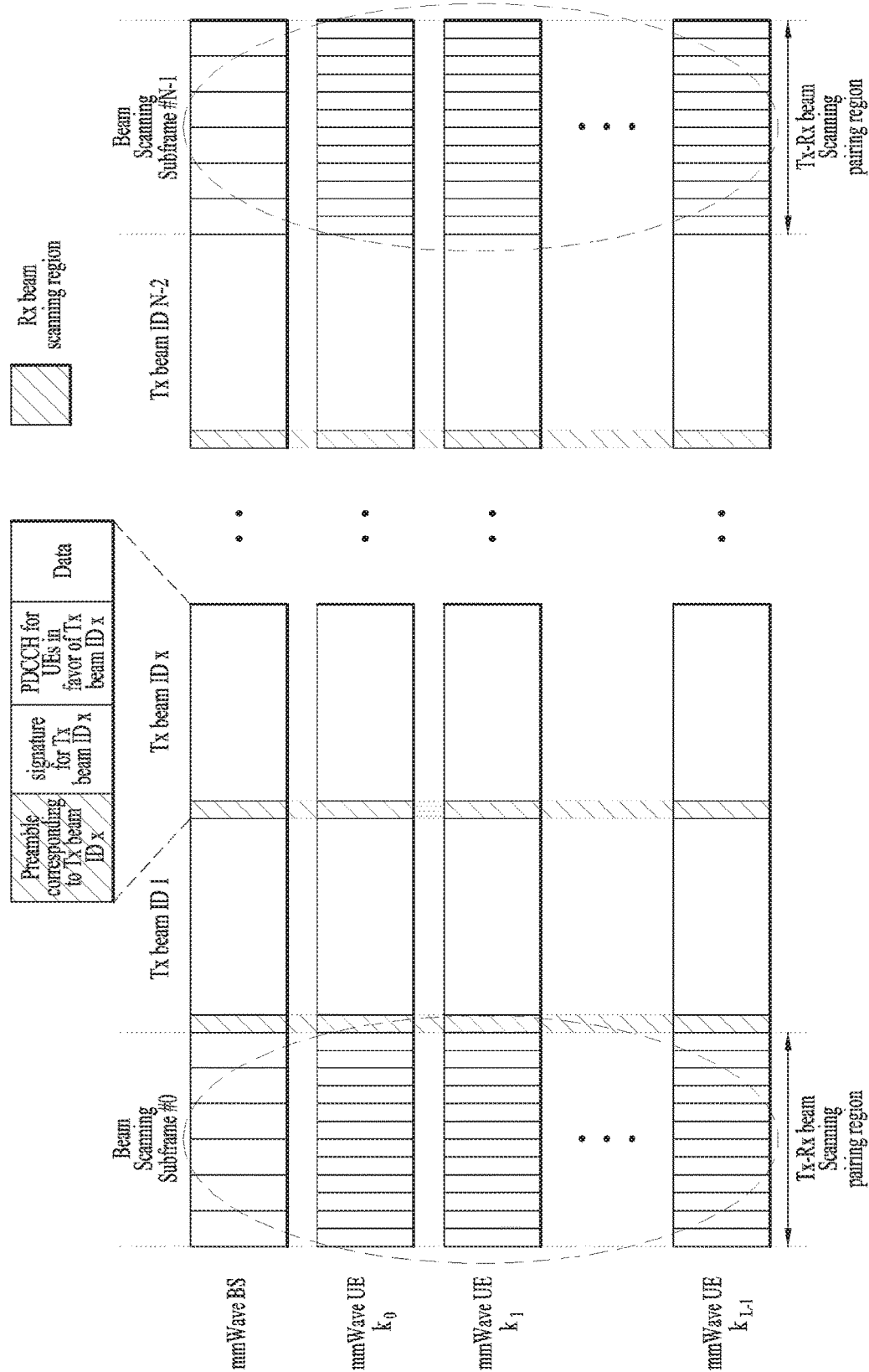
FIG. 12 is a diagram to describe a method of semi-persistently configuring a short term Rx beam scanning interval applicable to an mmWave system.

FIG. 12 is a diagram to describe a method of semi-persistently configuring a short term Rx beam scanning interval applicable to an mmWave system.

Referring to FIG. 12, a long term beam scanning region is assigned by Tx-Rx beam scanning subframe N period. In this case, an Rx beam scanning region for performing Rx beam scanning according to a Tx beam transmitted in a beam scanning subframe except the long term beam scanning region can be semi-persistently assigned through a higher layer signal. A preamble corresponding to Tx beam ID of a transmitting end is transmitted on an Rx beam scanning region, and all UEs can scan an Rx beam corresponding to each Tx beam ID.

Each receiving end (i.e., UEs) can measure and feed back a power of a transmitted preamble or a CQI corresponding thereto to a transmitting end (i.e., BS).

Referring to FIG. 12, an Rx beam scanning region can be configured in the respective beam scanning subframes except a Tx-Rx beam scanning region (or a Tx-Rx beam scanning pairing region) of a long term. The transmitting end can transmit a preamble corresponding to a corresponding Tx beam ID and a signature for the Tx beam ID in a Tx beam direction in Rx beam scanning subframes.

In this case, the preamble is a sort of a sequence and may become a reference signal. The receiving end can read the corresponding preamble without a decoding process. Namely, every mmWave UE can receive the preamble and identify a Tx beam ID that matches the corresponding preamble. Since it is able to confirm what the corresponding signature is by decoding the corresponding subframe, a Tx-Rx beam matched UE can read the corresponding signature only.

In FIG. 12, the receiving end can perform Rx beam scanning. In doing so, Rx beam scanning configuration information can be configured through RRC signal. A beam scanning subframe for Rx beam scanning can be configured like Rx beam scanning configuration information defined in Table 4.

TABLE 4

| Rx beam scanning configuration In Non beam scanning area | | Beam scanning subframe index corresponding to non beam scanning subframe area | | |
|---|---|---|---|---|
| | | 0 | 1 | 2 |
| Rx beam scanning index | 0 | Rx beam scanning$_{areaassignment}$off | off | off |
| | 1 | on | off | off |
| | 2 | off | on | off |
| | 3 | off | off | on |
| | . | | | |
| | . | | | |
| | . | | | |
| | 7 | on | on | on |

Table 4 is provided to describe one of methods of configuring an Rx beam scanning region in a short term beam scanning subframe region. Table 4 is configured on the assumption of K=3 that is the number of scanning subframes corresponding to a resource allocation region except a long term Tx-Rx beam scanning region. Of course, the scanning subframe number K may vary depending on a system environment, the number of UEs, and Rx antenna beam performance.

Referring to Table 4, a receiving end can check whether an Rx beam scanning region is on or off based on an Rx beam scanning index and a beam scanning subframe index according to Rx beam scanning configuration information in the Rx bam scanning region except a long term Tx-Rx beam scanning region within a period of the long term Tx-Rx beam scanning region. Hence, the receiving end can perform a short term scanning in the 'on' region. For instance, in case of an Rx beam scanning index 2, it indicates that a preamble is transmitted in a subframe region having a beam scanning subframe index 1.

As described above, the Rx beam scanning configuration information of Table 4 can be semi-persistently transmitted through higher layer signaling from a transmitting end.

In the beam scanning subframe configuration of FIG. 12, a signature transmitted region and a PDCCH transmitted region can be integrated into a single region. Thus, in case that an Ex beam scanning region is configured as a single region, Tx beam ID should be contained in PDCCH and an mmWave UE should perform Blind Decoding (BD) on the PDCCH in every scanning subframe.

2.2 CQI Feedback Method

Each of UEs (e.g., a receiving end) can measure CQI or Rx power through the preamble described in Section 2.1. Each UE compares CQI or Rx power obtained through long or short term scanning and is then able to transmit feedback. Feedback types are described as follows.

(1) Updated CQI feedback (2) Best Rx UE ID mapped to Tx beam ID (Tx beam ID and Rx UE temporary ID)

(3) Updated CQI and IE ID mapped to Tx beam ID 2.2.1 Updated CQI Feedback Method $P_{max\_rx\_j}^{tx\_i}(k_s)$ indicates an Rx maximum power of $k_s^{th}$ beam scanning subframe for Tx beam ID i and Rx beam ID j enabling a maximum Rx power according to the Tx beam ID i.

Moreover, $CQI_{max\_rx\_j}^{tx\_i}(k_s)$ indicates a CQI index value of $k_s^{th}$ beam scanning subframe for Tx beam ID i and Rx beam ID j enabling a maximum Rx SNR according to the Tx beam ID i. Here, when $k_s$ is defined as a Tx beam scanning subframe index, a UE can transmit updated CQI feedback if the following condition of Equation 21 is met.

$$P_{max\_rx\_j}^{tx\_i}(k_s) \geq P_{max\_rx\_k}^{tx\_l}(k_{s+1}), \text{ or}$$

$$CQI_{max\_rx\_j}^{tx\_i}(k_s) \geq CQI_{max\_rx\_k}^{tx\_l}(k_{s+1}) \qquad \text{[Equation 21]}$$

If a power value for Tx beam ID 1 and Rx beam ID k enabling a maximum Rx power according to Tx beam ID 1 in scanning subframe s+1 is smaller than a power value for Tx beam ID i and Rx beam ID j enabling a maximum Rx power according to Tx beam ID i in scanning subframe s, a UE can feed back an updated CQI value $CQI_{max\_rx\_k}^{tx\_l}(k_{s+1})$ corresponding to $CQI_{max\_rx\_k}^{tx\_l}(k_{s+1})$ to a base station. Here, the scanning subframe s may indicate a scanning subframe of a Tx/Rx scanning paring interval or an Rx beam scanning interval.

Such feedback can be used by being referred to by a corresponding mmWave UE if a transmission with Rx beam k corresponding to Tx beam ID 1 is necessary.

Or, if a CQI value of a scanning subframe s+1 is equal to or smaller than a CQI value of a scanning subframe s, a UE can feed back a CQI value of the scanning subframe s+1 to a base station.

2.2.2 Method of Feeding Back Best UE ID Mapped to Tx Beam ID

In the following, a method of feeding back information (e.g., Temporary UE ID (TUEID)) on a best receiving UE mapped to Tx beam ID is described.

$$P_{max\_rx\_j}^{tx\_i}(k_s) < P_{max\_rx\_k}^{tx\_l}(k_{s+1}), \text{ or}$$

$$CQI_{max\_rx\_j}^{tx\_i}(k_s) < CQI_{max\_rx\_k}^{tx\_l}(k_{s+1}) \quad \text{[Equation 22]}$$

When Equation 22 is met, a UE can feed back a corresponding TX beam ID and a temporary UE ID of the UE to a base station. Here, the fed-back information can be derived as Equation 23.

$$I_{s+1} = f(\hat{I}_{tx\_beam}, TUEID) \quad \text{[Equation 23]}$$

In Equation 23, $\hat{I}_{tx\_beam}$ means Tx beam ID confirmed by a receiving end through a signature and TUEID means temporary UE ID for a corresponding mmWave UE. Namely, the mmWave UE transmits a value derived from the function such as Equation 23, thereby implicitly feeding back Tx beam ID and temporary UE ID to a base station.

The reason why temporary UEID of an mmWave UE is used is to reduce the danger of exposure of UE's location secrecy or personal information since it is not guaranteed that Tx-Rx pairing is completed between a UE and a BS in a short term scanning region. Moreover, in case of an mmWave system, data transmission/reception is possible only if Tx-Rx pairing is matched. Since the number of target mmWave UEs is small, although TUEID is sued, a base station can be aware that Tx-Rx pairing is matched for which UE and also aware that a resource will be allocated to which UE. Therefore, a problem of duplicate allocation of resource is not caused.

2.2.3 1-Bit Flag Feedback Method for Preferred Tx Beam ID Check

Described in the following is a 1-bit flag feedback method for preferred Tx beam ID check according to one embodiment of the present invention.

Figure 13:
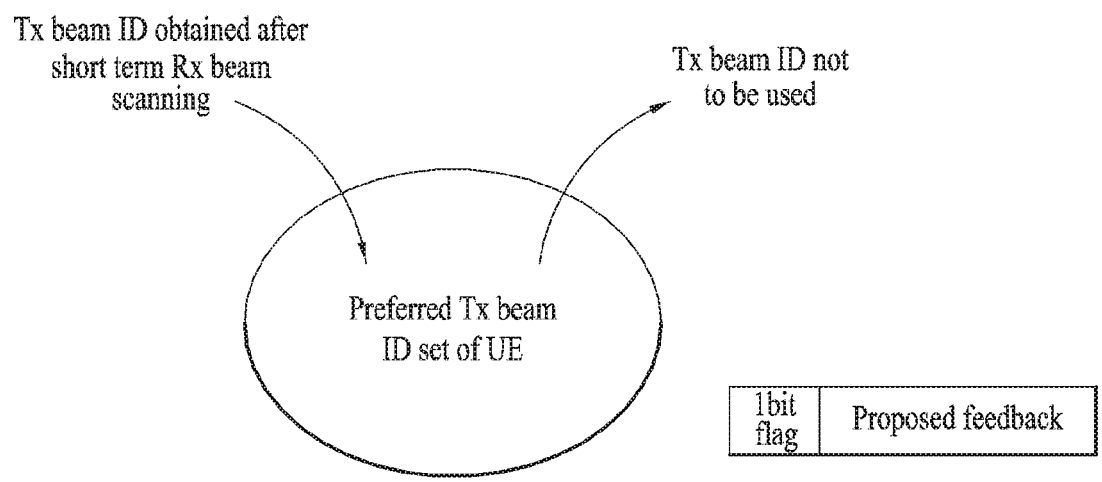
FIG. 13 is a diagram to describe a method of configuring a preferred Tx beam ID set and also describe a 1-bit flag.

FIG. 13 is a diagram to describe a method of configuring a preferred Tx beam ID set and also describe a 1-bit flag.

A preferred Tx beam ID set in embodiments of the present invention means a Tx beam ID set preferred by an mmWave UE, and a UE may have one or more preferred Tx beam IDs. The mmWave UE may measure CQI in a short term Rx beam scanning region and transmit feedback, which contains 1-bit flag indicating whether Tx beam ID is included in the preferred Tx beam ID set, to a base station.

In this case, if a prescribed Tx beam ID enters a preferred Tx beam ID set of a prescribed UE, the UE decodes a signature for a Tx beam ID matching the et and has an opportunity to use a resource allocated through PDCCH.

Referring to FIG. 13, if is able to observe a process as follows. First of all, Tx beam ID (e.g., second Tx beam ID), which is obtained by an mmWave UE after performing short term Rx beam scanning, is included in a preferred Tx beam ID set configured and maintained by the corresponding mmWave UE. And, Tx beam ID not to be used by the mmWave UE is removed.

Moreover, assume a case that Tx beam ID m preferred by a prescribed mmWave UE is included in a preferred Tx beam ID set of the corresponding UE. The mmWave UE may set a feedback flag to '1' (i.e., enabled status), add the flag to the feedback value proposed in the aforementioned sections 2.2.1 and 2.2.2, and then transmit the feedback value. By referring to the received feedback values, a base station can additionally allocate a resource for the corresponding mmWave UE to the Tx beam ID m.

The base station can transmit a signature corresponding to the Tx beam ID m in an additionally allocated DL resource region (e.g., a beam scanning subframe). The mmWave UE may perform decoding on the signature corresponding to the Tx beam ID m in the preferred Tx beam ID set and then perform blind decoding on UE-specific PDCCH (cf. 3GPP LTE/LTE-A system). Thereafter, the mmWave UE can receive data by decoding PDSCH corresponding to the PDCCH.

Referring to FIG. 13, 1-bit flag feedback for the aforementioned preferred Tx beam ID check can perform additional resource allocation to the mmWave UE, thereby enabling a radio resource to be used efficiently. For instance, in case that there is a preferred Tx beam ID in a short term Rx scanning subframe as well as a Tx beam ID obtained through a long term Tx-Rx beam scanning paring region, a corresponding mmWave UE can receive resource allocation additionally by informing a base station that there is the preferred Tx beam ID through a flag in the course of feeding back a corresponding CQI and/or Tx beam ID and TUEID.

2.3 Short Term Rx Beam Scanning Method

Short term Rx beam scanning methods described in the aforementioned methods in the sections 2.1 and 2.2 and overall processes for feedback methods therefor are described in detail as follows.

According to embodiments of the present invention, in order to match up a preferred Tx beam varying according to a short term channel variation of a receiving end side with a corresponding Rx beam to form a pair, a semi-persistent Rx beam scanning resource region can be allocated to a beam scanning subframe (or frame/slot).

And, each mmWave UE can configure a Tx beam set preferred by each mmWave UE to raise additional data transmission/reception efficiency. For instance, each mmWave UE decodes a preferred Tx beam signature, thereby being provided with an opportunity for using resources of Tx beam subframes corresponding to the preferred Tx beam set. Moreover, by providing a process for differently performing a feedback information transmission by comparing CQIs obtained from long term scanning and short term scanning, each mmWave UE can adaptively cope with the short term channel variation.

Figure 14:
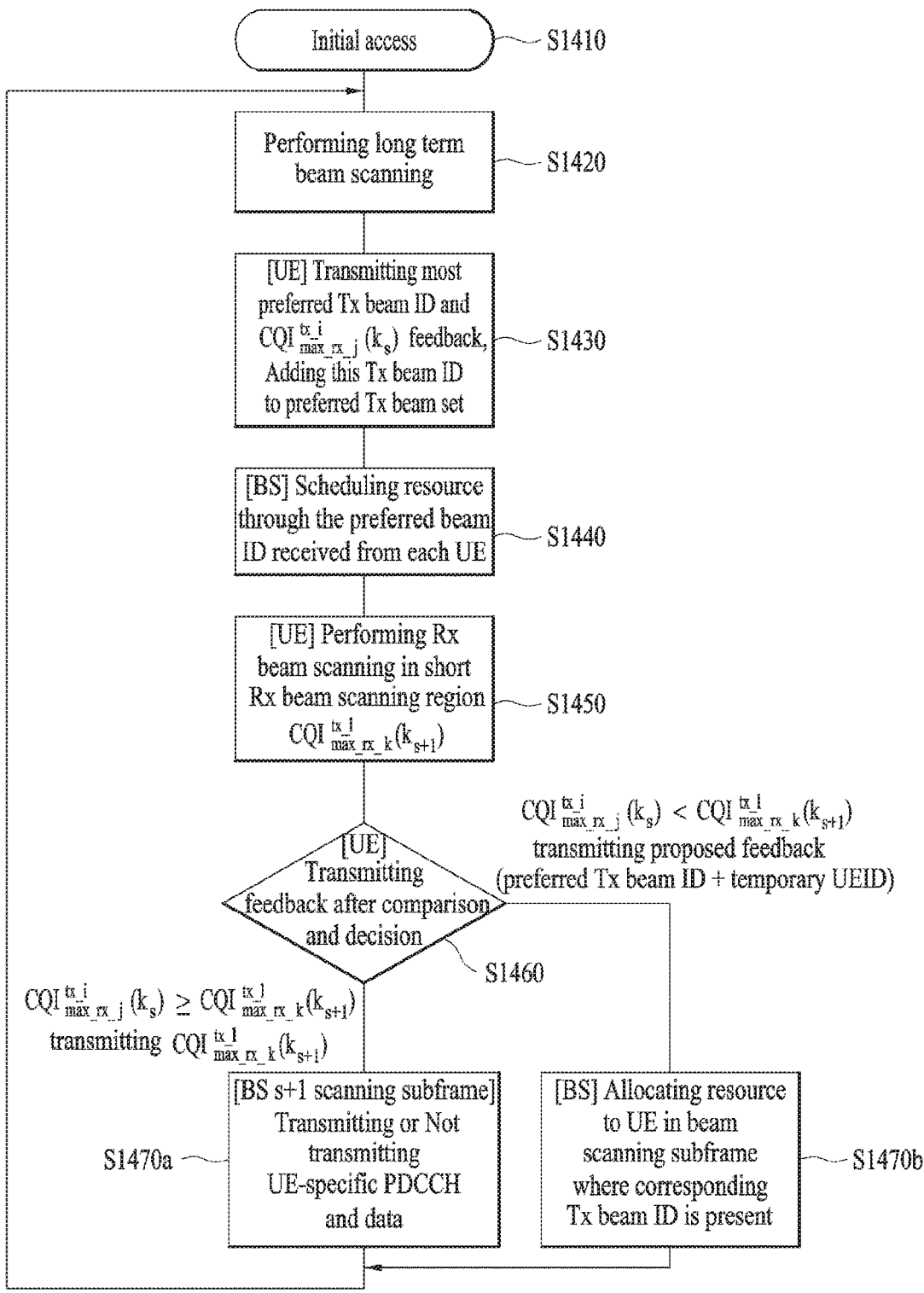
FIG. 14 is a diagram to describe a method of adaptively maintaining a Tx-Rx pair through long term scanning and short term scanning.

Such technical features are described in detail with reference to FIG. 14. FIG. 14 is a diagram to describe a method of adaptively maintaining a Tx-Rx pair through long term scanning and short term scanning.

Referring to FIG. 14, an mmWave UE can make a registration at an mmWave BS by performing an initial access procedure. Namely, RRC connection is established between the mmWave UE and the mmWave BS and the mmWave UE and BS are in a data transmittable/receivable state [S1410].

Yet, since a Tx-Rx beam pair between the mmWave UE and BS is not configured, the mmWave UE and BS should perform a beam scanning process for forming a Tx-Rx beam pair.

The mmWave UE periodically performs preset long term beam scanning on a higher layer signal or system, thereby finding a Tx-Rx beam pair. The step of performing the long term beam scanning may refer to the former description with reference to FIG. 11 and FIG. 12 [S1420].

The mmWave UE may measure a most preferred first Tx beam ID and $CQI_{max\_rx\_j}^{tx\_i}(k_s)$ (or, first CQI) at this point and then feed them back to the BS. If the mmWave UE is able to configure a preferred Tx beam set, the corresponding UE can add the first Tx beam ID for the Tx-Rx beam pair obtained through the long term beam scanning to the preferred Tx beam set [S1430].

Based on the feedback information received in the step S1430, the BS can check Tx beam IDs preferred by mmWave UEs. Since Tx beam IDs matches each subframe, the BS can allocate a resource to the corresponding mmWave UE in a subframe having the first Tx beam ID mapped thereto based on the fed-back first Tx beam ID [S1440].

Yet, in an mmWave system, a channel state may rapidly changes depending on a channel environment of a receiving end (e.g., UE). Namely, although a Tx-Rx beam pair is formed according to the long term beam scanning in the step S1420, the Tx-Rx beam pair may be changed according to short term channel variation. Moreover, the mmWave UE and BS can transmit/receive data only if the Tx-Rx pair is matched. Since a resource region allocated to the mmWave UE may be small, if a channel environment is good, it is able to increase data throughput by additionally allocating a resource region to the mmWave UE.

Therefore, it is unnecessary for the mmWave UE and BS to reconfigure or additionally configure a Tx-Rx beam pair. To this end, the BS may transmit Rx beam scanning configuration information for short term beam scanning to mmWave UEs through higher layer signal. If receiving the Rx beam scanning configuration information, each of the mmWave UEs can confirm an Rx beam scanning region allocated to itself by referring to an Rx beam scanning index and a beam scanning subframe index. Accordingly, each of the mmWave UEs can perform Rx beam scanning in the allocated Rx beam scanning region. For details, FIG. 12 may be referred to [S1450].

In the step S1450, each of the mmWave UEs can measure a second CQI and/or a second Rx power based on a received preamble or signature. The UE compares the measured second CQI and/or Rx power with the first CQI and/or Rx power measured in the step S1420, thereby transmitting feedback information to the BS. For this, the former description of Section 2.2 can be referred to [S1460].

As a result of the step S1460, if the same case as Equation 21 occurs, the mmWave UE can feed back $CQI_{max\_rx\_k}^{tx\_l}$ ($k_{s+1}$), which the an updated second CQI value, to the BS [S1470a].

As a result of the step S1460, if the same case as Equation 22 occurs, the mmWave UE can feed back a preferred Tx beam ID (or a second Tx beam ID) and TUEID to the BS. In such a case, the mmWave BS can additionally allocate a resource to the corresponding mmWave UE in a beam scanning subframe to which the second Tx beam ID is mapped [S1470b].

The steps S1460, S1470a and S1470b are further described as follows.

First of all, if the first CQI and/or the first Rx power obtained from the long term beam scanning in the step S1420 is smaller than the second CQI and/or the second Rx power obtained from the short term beam scanning in the step S1450, the mmWave UE enables the BS to change MCS and the like for data transmission by feeding back the second CQI and/or the second Rx power to the BS, thereby enabling data transmission/reception to be performed more powerfully.

On the contrary, if the first CQI and/or the first Rx power obtained from the long term beam scanning in the step S1420 is greater than the second CQI and/or the second Rx power obtained from the short term beam scanning in the step S1450, since a channel environment of a corresponding subframe is very good, the mmWave UE can increase data throughput by receiving additional scheduling. Therefore, the mmWave UE can receive additional radio resource allocation by feeding back the corresponding second Tx beam ID and TUEID to the BS. Namely, if the mmWave UE further has a preferred second Tx beam ID other than a resource region allocated through long term beam scanning, the corresponding mmWave UE can further receive allocation of an additional radio resource. In this case, the mmWave UE can transmit a 1-bit flag for a preferred Tx beam ID check in a manner that the 1-bit flag is contained in the feedback information in the step S1660. For details, Section 2.2.3 can be referred to.

3. Apparatus

Figure 15:
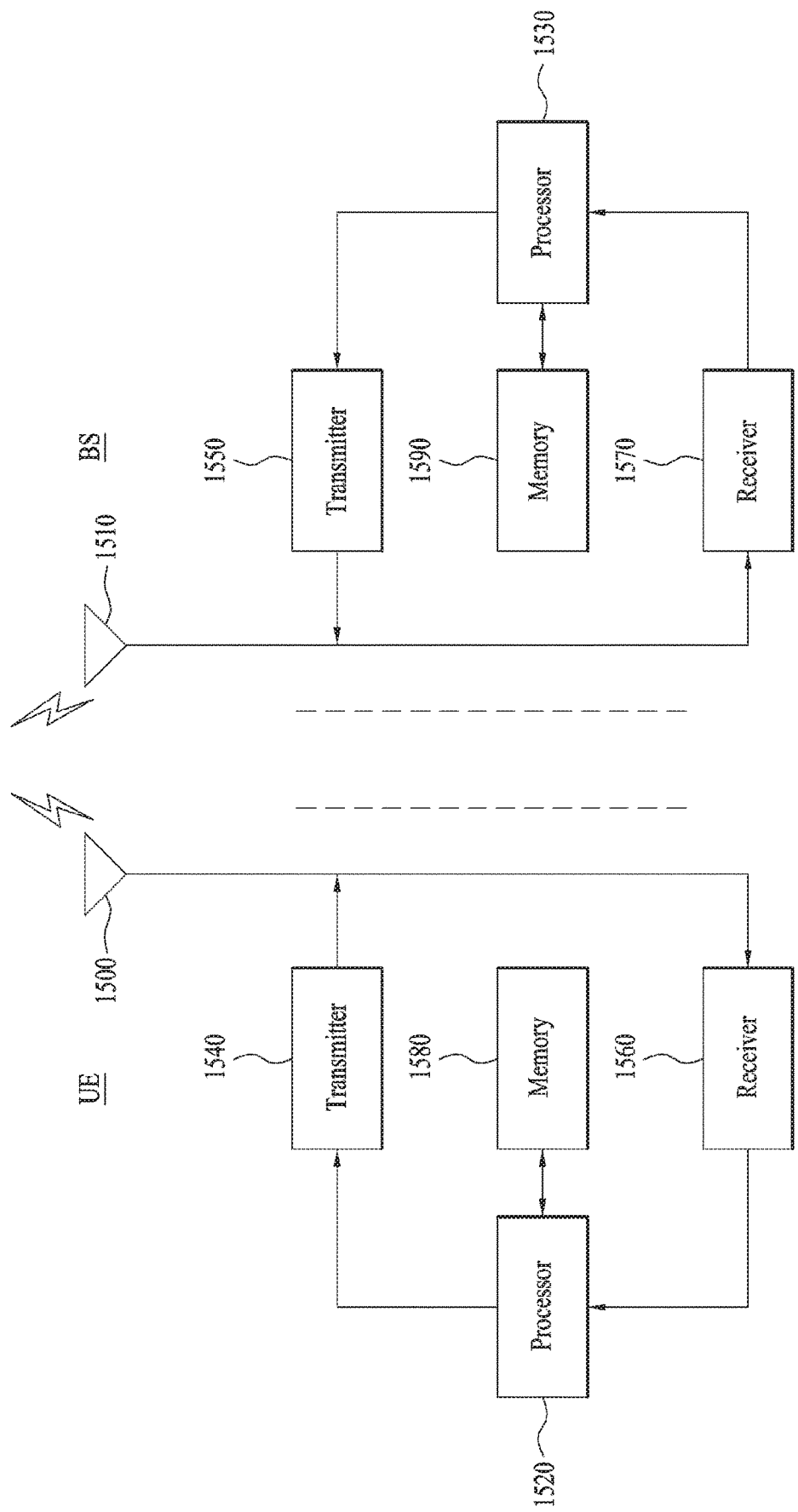
FIG. 15 is a diagram showing an apparatus for implementing the methods described with reference to FIGS. 1 to 14.

Apparatuses illustrated in FIG. 15 are means that can implement the methods described before with reference to FIGS. 1 to 14.

An mmWave UE may act as a transmission end on a UL and as a reception end on a DL. An mmWave eNB (e-Node B) may act as a reception end on a UL and as a transmission end on a DL.

That is, each of the mmWave UE and the mmWave eNB may include a transmitter 1540 or 1550 and a receiver 1560 or 1570, for controlling transmission and reception of information, data, and/or messages, and an antenna 1500 or 1510 for transmitting and receiving information, data, and/or messages.

Each of the UE and the eNB may further include a processor 1520 or 1530 for implementing the afore-described embodiments of the present disclosure and a memory 1580 or 1590 for temporarily or permanently storing operations of the processor 1520 or 1530.

The embodiments of the present invention may be implemented using the components and functions of the UE and the eNB. In addition, each of the processors of the UE and the eNB may include an analog beamformer supporting analog beamforming and a digital beamformer supporting digital beamforming. Accordingly, the processor of the UE or the eNB may combine the methods described in Chapters 1 to 2 to enable robust data communications despite short term channel variations caused by characteristics of mmWave system and allocation of additional radio resources to an mmWave UE by scanning short term and/or long term Tx-Rx beam pair. For a detailed description thereof, refer to Chapters 1 and 2.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1580 or 1590 and executed by the processor 1520 or 1530. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of scanning transmission and reception beams by a millimeter Wave (mmWave) user equipment in a wireless access system supportive of mmWave, the method comprising:
performing a long term beam scanning in a period N, wherein performing the long term beam scanning comprises receiving a first preamble and obtaining first Channel Quality Information (CQI) based on the first preamble;
transmitting feedback information containing a first transmission beam Identifier (Tx beam ID) obtained through the long term beam scanning to an mmWave base station;
receiving a higher layer signal containing reception beam scanning configuration information assigned for a short term beam scanning;
performing the short term beam scanning in a reception beam scanning region based on the reception beam scanning configuration information, wherein performing the short term beam scanning comprises receiving a second preamble and obtaining second CQI based on the second preamble; and
comparing the first CQI and the second CQI with each other,
wherein based on the first CQI being equal to or greater than the second CQI, the mmWave user equipment feeds back the second CQI to the mmWave base station, and
wherein based on the first CQI being smaller than the second CQI, the mmWave user equipment feeds back a second Tx beam ID mapped to the second preamble and a Temporary User Equipment Identifier (TUEID) of the mmWave user equipment to the mmWave base station.

2. The method of claim 1, wherein the first Tx beam ID is mapped to a specific beam scanning subframe and then used for transmitting and receiving signals for the mmWave user equipment preferring to the first Tx beam ID.

3. The method of claim 1, wherein based on the first CQI being smaller than the second CQI, the mmWave user equipment is additionally allocated with a resource in a beam scanning subframe where the second Tx beam ID is mapped.

4. A millimeter Wave (mmWave) user equipment configured to scan transmission and reception beams in a wireless access system supportive of mmWave, the mmWave user equipment comprising:
a transmitter;
a receiver; and
a processor for performing scanning the transmission and reception beams,
wherein the processor is configured to:
control the receiver to perform a long term beam scanning in a period N, wherein the receiver is controlled to receive a first preamble, and the processor is further configured to obtain first Channel Quality Information (CQI) based on the first preamble;
control the transmitter to transmit feedback information containing a first transmission beam Identifier (Tx beam ID) obtained through the long term beam scanning to an mmWave base station;
control the receiver to receive a higher layer signal containing reception beam scanning configuration information assigned for a short term beam scanning;
control the receiver to perform the short term beam scanning in a reception beam scanning region based on the reception beam scanning configuration information, wherein the receiver is controlled to receive a second preamble, and the processor is further configured to obtain second CQI based on the second preamble; and
compare the first CQI and the second CQI with each other,
wherein based on the first CQI being equal to or greater than the second CQI, the mmWave user equipment feeds back the second CQI to the mmWave base station, and
wherein based on the first CQI being smaller than the second CQI, the mmWave user equipment feeds back a second Tx beam ID mapped to the second preamble and a Temporary User Equipment Identifier (TUEID) of the mmWave user equipment to the mmWave base station.

5. The mmWave user equipment of claim 4, wherein the first Tx beam ID is mapped to a specific beam scanning subframe and then used for transmitting and receiving signals for the mmWave user equipment preferring to the first Tx beam ID.

6. The mmWave user equipment of claim 4, wherein based on the first CQI being smaller than the second CQI, the mmWave user equipment is additionally allocated with a resource in a beam scanning subframe where the second Tx beam ID is mapped.

\* \* \* \* \*